United States Patent
Holtschulte et al.

(10) Patent No.: US 9,982,147 B2
(45) Date of Patent: May 29, 2018

(54) AQUEOUS DIP-COATING COMPOSITION FOR ELECTROCONDUCTIVE SUBSTRATES, COMPRISING BISMUTH AND A PHOSPHORUS-CONTAINING, AMINE-BLOCKED COMPOUND

(71) Applicants: BASF COATINGS GmbH, Muenster (DE); HENKEL AG & Co. KGaA, Duesseldorf (DE)

(72) Inventors: Sabine Holtschulte, Ascheberg (DE); Andreas Niegemeier, Duesseldorf (DE); Dominik Stoll, Muenster (DE)

(73) Assignees: BASF Coatings GmbH, Munich (DE); HENKEL AG & Co. KGaA, Duesseldorf (DE)

( * ) Notice: Subject to any disclaimer, the term of this patent is extended or adjusted under 35 U.S.C. 154(b) by 57 days.

(21) Appl. No.: 15/103,118

(22) PCT Filed: Dec. 10, 2013

(86) PCT No.: PCT/EP2013/076037
§ 371 (c)(1),
(2) Date: Jun. 9, 2016

(87) PCT Pub. No.: WO2015/086042
PCT Pub. Date: Jun. 18, 2015

(65) Prior Publication Data
US 2016/0369114 A1    Dec. 22, 2016

(51) Int. Cl.
| | | |
|---|---|---|
| *C09D 5/44* | (2006.01) |
| *C25D 9/02* | (2006.01) |
| *C25D 13/06* | (2006.01) |
| *C25D 13/12* | (2006.01) |
| *C25D 13/18* | (2006.01) |
| *C25D 13/20* | (2006.01) |
| *C09D 5/08* | (2006.01) |
| *C23C 18/12* | (2006.01) |

(52) U.S. Cl.
CPC ........... *C09D 5/4492* (2013.01); *C09D 5/086* (2013.01); *C09D 5/443* (2013.01); *C09D 5/4488* (2013.01); *C25D 9/02* (2013.01); *C25D 13/06* (2013.01); *C25D 13/12* (2013.01); *C25D 13/18* (2013.01); *C25D 13/20* (2013.01); *C23C 18/1254* (2013.01)

(58) Field of Classification Search
None
See application file for complete search history.

(56) References Cited

U.S. PATENT DOCUMENTS

| | | | |
|---|---|---|---|
| 2003/0164299 A1 | 9/2003 | Hermann et al. | |
| 2008/0268256 A1 | 10/2008 | Nagano et al. | |
| 2009/0087667 A1 | 4/2009 | Tomizaki et al. | |
| 2010/0163418 A1 | 7/2010 | Chouai et al. | |
| 2011/0311838 A1* | 12/2011 | Kawagoshi | C09D 5/448 428/626 |
| 2013/0052489 A1 | 2/2013 | Gunter Klein et al. | |
| 2014/0065313 A1* | 3/2014 | Groenewolt | C08G 18/10 427/387 |
| 2014/0197039 A1* | 7/2014 | Inbe | C08G 18/58 205/317 |
| 2015/0191625 A1* | 7/2015 | Lomoelder | C08G 18/718 524/91 |

FOREIGN PATENT DOCUMENTS

| | | |
|---|---|---|
| CN | 101260272 A | 9/2008 |
| CN | 102282223 A | 12/2011 |
| CN | 102341531 A | 2/2012 |
| DE | 26 58 812 A1 | 7/1978 |
| DE | 35 18 732 A1 | 11/1986 |
| DE | 35 18 770 A1 | 11/1986 |
| DE | 10 2005 045 228 A1 | 4/2007 |
| DE | 10 2008 016 220 A1 | 10/2009 |
| EP | 0 004 090 A2 | 9/1979 |
| EP | 0 012 463 A1 | 6/1980 |
| EP | 0 505 445 B1 | 11/1994 |
| EP | 0 642 558 B2 | 10/2001 |
| EP | 0 961 797 B1 | 4/2003 |
| EP | 1 342 757 A1 | 9/2003 |
| EP | 2 405 035 A1 | 1/2012 |
| JP | 2011/57944 A | 3/2011 |
| JP | 2012-568 A | 1/2012 |
| WO | 82/00148 A1 | 1/1982 |
| WO | 95/07319 A1 | 3/1995 |

(Continued)

OTHER PUBLICATIONS

International Search Report dated Jul. 20, 2014 in PCT/EP2013/076037 filed Dec. 10, 2013.

*Primary Examiner* — Marc S Zimmer
(74) *Attorney, Agent, or Firm* — Oblon, McClelland, Maier & Neustadt, L.L.P.

(57) ABSTRACT

The present invention relates to an aqueous coating composition (A) comprising at least one cathodically depositable binder (A1) and optionally at least one crosslinking agent (A2), for at least partly coating an electrically conductive substrate with an electrocoat material, where (A) comprises a total amount of at least 30 ppm of bismuth, based on the total weight of (A), and additionally at least one phosphorus-containing compound (P) blocked with at least one amine of the general formula (I), to the use of (A) for at least partly coating an electrically conductive substrate with an electrocoat material, to a corresponding coating method, and to an at least partly coated substrate obtainable by this method.

24 Claims, No Drawings

(56) References Cited

FOREIGN PATENT DOCUMENTS

| WO | 2004/018570 A2 | 3/2004 |
| WO | 2004/018580 A1 | 3/2004 |
| WO | 2009/021719 A2 | 2/2009 |
| WO | 2009/115504 A1 | 9/2009 |
| WO | 2010/063332 A1 | 6/2010 |
| WO | 2010/077901 A1 | 7/2010 |
| WO | 2011/029502 A1 | 3/2011 |
| WO | WO 2013/035765 * | 3/2014 |

* cited by examiner

AQUEOUS DIP-COATING COMPOSITION FOR ELECTROCONDUCTIVE SUBSTRATES, COMPRISING BISMUTH AND A PHOSPHORUS-CONTAINING, AMINE-BLOCKED COMPOUND

The present invention relates to an aqueous coating composition (A) comprising at least one cathodically depositable binder (A1) and optionally at least one crosslinking agent (A2), for at least partly coating an electrically conductive substrate with an electrocoat material, where (A) comprises a total amount of at least 30 ppm of bismuth, based on the total weight of (A), and additionally at least one phosphorus-containing compound (P) blocked with at least one amine of the general formula (I), to the use of (A) for at least partly coating an electrically conductive substrate with an electrocoat material, to a corresponding coating method, and to an at least partly coated substrate obtainable by this method.

A normal requirement within the automobile sector is that the metallic components used for manufacture must be protected against corrosion. The requirements concerning the corrosion prevention to be achieved are very stringent, especially as the manufacturers often give a guarantee against rust perforation over many years. Such corrosion prevention is normally achieved by coating the components, or the substrates used in their manufacture, with at least one coating apt for the purpose.

A disadvantage of the known coating methods, particularly affecting the known methods employed within the automobile industry, is that these methods normally envisage a phosphatizing pretreatment step, in which the substrate for coating, after an optional cleaning step and before a deposition coating step, is treated with a metal phosphate such as zinc phosphate in a phosphatizing step, in order to ensure adequate corrosion prevention. This pretreatment normally entails the implementation of a plurality of method steps in a plurality of different dipping tanks with different heating. During the implementation of such pretreatment, moreover, waste sludges are produced, which burden the environment and have to be disposed of. On environmental and economic grounds, therefore, it is especially desirable to be able to forgo such a pretreatment step, but nevertheless to achieve at least the same corrosion prevention effect as achieved using the known methods.

Cathodically depositable bismuth-containing coating compositions which can be deposited onto a suitable substrate in a one-stage coating step are known from, for example, WO 2009/021719 A2, WO 2004/018580 A1, WO 2004/018570 A2, EP 0 642 558 B2, and WO 95/07319 A1. The bismuth compound used in each case typically functions here as a crosslinking catalyst. A disadvantage of the coating compositions disclosed therein, however, is that the resulting coated substrates often lack adequate corrosion protection.

Coating compositions which can be used as clearcoat or topcoat material and which comprise a phosphorus-containing, amine-blocked catalyst are known from, for example, WO 2011/029502 A1, WO 2010/063332 A1, US 2009/0087667 A1, US 2008/0268256 A1, and JP 2012-000568 A. Coating compositions cured accordingly are notable, for example, for good scratch resistance. The use of these catalysts in electrocoat systems and, correspondingly, any improved corrosion protection attributable to the presence of these catalysts in these systems, such protection being afforded to substrates coated accordingly, is not described in any of these documents.

DE 26 58 812 A1 discloses cathodically depositable electrocoat materials which as their crosslinking catalyst include a phosphoric ester of at least one phenol. A disadvantage of the coating compositions disclosed therein, however, is that the resulting coated substrates often lack sufficient corrosion protection.

A need exists for electrophoretically depositable coating compositions for at least partial coating of electrically conductive substrates with an electrocoat material that permit—especially with view to forgoing the normally implemented phosphatizing pretreatment step—a more economic and more environmental coating method than conventional coating compositions used, while being nevertheless suitable at least in equal degree for achieving the corrosion prevention effect necessary for such compositions.

It is an object of the present invention, therefore, to provide a coating composition for at least partial coating of an electrically conductive substrate that has advantages over the coating compositions known from the prior art. In particular it is an object of the present invention to provide coating compositions which permit a more economic and/or environmental coating method than conventional coating compositions used. In particular it is an object of the present invention, moreover, to provide a method which allows more economic and/or environmental coating than conventional coating methods, which, in other words, makes it possible, in particular, to forgo the phosphatizing which must normally be carried out by means of a metal phosphate even prior to deposition coating, but with which, nevertheless, at least the same—and more particularly an enhanced—corrosion prevention effect can be achieved than is achieved with the normal methods.

This object is achieved by the subject matter claimed in the claims and also by the preferred embodiments of that subject matter that are described in the description hereinafter.

A first subject of the present invention is therefore an aqueous coating composition (A) comprising (A1) at least one cathodically depositable binder and (A2) optionally at least one crosslinking agent, for at least partly coating an electrically conductive substrate with an electrocoat material, wherein the coating composition (A) comprises a total amount of at least 30 ppm of bismuth, based on the total weight of the coating composition (A), and wherein the coating composition (A) comprises at least one phosphorus-containing compound (P) blocked with at least one amine of the general formula (I),

(I)

in which $R^1$ and $R^2$ each independently of one another are $C_{1-18}$ aliphatic radical, are a $C_{3-12}$ cycloaliphatic radical, are a $C_{3-12}$ cycloaliphatic radical bridged via a $C_{1-10}$ aliphatic group, or are an aryl or heteroaryl radical bridged via a $C_{1-10}$ aliphatic group, and $R^3$ is H, a $C_{1-18}$ aliphatic radical, a $C_{3-12}$ cycloaliphatic radical, a $C_{3-12}$ cycloaliphatic radical bridged via a $C_{1-10}$ aliphatic group, or an aryl or heteroaryl radical bridged via a $C_{1-10}$ aliphatic group.

The aqueous coating composition (A) of the invention therefore serves for producing an electrocoat on a substrate surface of an electrically conductive substrate.

It has surprisingly been found that the aqueous coating composition (A) of the invention, particularly when used in a method for at least partly coating an electrically conductive substrate with an electrocoat material, makes it possible to be able to forgo the step normally needing to be carried out prior to deposition coating, more particularly electrocoating, namely the step of pretreating the electrically conductive substrate for at least partial coating with a metal phosphate such as zinc phosphate in order to form a metal phosphate layer on the substrate, thereby allowing the coating method in question to be made overall not only more economical, more particularly less time-consuming and cost-intensive, but also more environmental than conventional methods.

In particular it has surprisingly been found that the coating composition (A) of the invention allows the provision of electrically conductive substrates, coated at least partly with an electrocoat material, which in comparison to substrates coated accordingly by conventional methods have at least no disadvantages, and in particular have advantages, in terms of their corrosion prevention effect, especially if the substrate used is aluminum, which in particular has not been subjected to any pretreatment such as phosphatizing.

It has further surprisingly been found that a method for at least partly coating an electrically conductive substrate that uses the coating composition of the invention makes it possible to obtain significant Bi coating of the substrate, more particularly of not less than 10 mg/m$^2$ Bi, in particular through a two-stage step (1) and, within this step (1), through stage (1a). The amount of bismuth here may be determined by x-ray fluorescence analysis, by means of the method described hereinafter. Surprisingly, corrosion protection can be improved further by the amine-blocked, phosphorus-containing compound (P) present in (A).

In one preferred embodiment, the term "comprising" in the sense of the present invention, as for example in connection with the aqueous coating composition (A) of the invention, has the meaning of "consisting of". With regard to the coating composition (A) of the invention in this preferred embodiment, one or more of the further components identified below and optionally present in the coating composition (A) used in accordance with the invention may be present in the coating composition (A), such as—besides (A1), bismuth, in particular in the form of (A3) and/or (A4) and with at least one amine-blocked compound (P) and water, and also, optionally, (A2), for example, the optional components (A5), (A6) and/or (A7) and/or (A8), and also organic solvents optionally present. All of these components may each be present in their preferred embodiments, as identified above and below, in the coating composition (A) used in accordance with the invention.

Substrate

Suitable electrically conductive substrates ed in accordance with the invention are all of the electrically conductive substrates known to the skilled person that are customarily employed. The electrically conductive substrates used in accordance with the invention are preferably selected from the group consisting of steel, preferably steel selected from the group consisting of cold-rolled steel, galvanized steel such as dip-galvanized steel, alloy-galvanized steel (such as Galvalume, Galvannealed, or Galfan, for example) and aluminumized steel, aluminum, and magnesium; particularly suitable are galvanized steel and aluminum. Especially preferred is a substrate of aluminum or a substrate having at least one surface of aluminum. Suitable as substrates, moreover, are hot-rolled steel, high-strength steel, Zn/Mg alloys, and Zn/Ni alloys. Particularly suitable substrates are parts of bodies or complete bodies of automobiles for production. The method of the invention can also be used for coil coating. Before the electrically conductive substrate in question is used, the substrate is preferably cleaned and/or degreased.

The electrically conductive substrate used in accordance with the invention may be substrate pretreated with at least one metal phosphate. The electrically conductive substrate used in accordance with the invention may, moreover, be a chromate substrate. Such pretreatment by phosphatizing or chromating, which normally takes place after the substrate has been cleaned and before it is dip-coated, is, in particular, a pretreatment step customary within the automobile industry. In this context it is especially desirable for a pretreatment, carried out optionally, to be designed advantageously from environmental and/or economic aspects. Therefore, for example, an optional pretreatment step is possible in which instead of a customary trication phosphatizing, the nickel component is omitted and instead a dication phosphatizing (comprising zinc and manganese cations and no nickel cations) is carried out on the electrically conductive substrate used in accordance with the invention, prior to coating with the aqueous coating composition (A).

A specific object of the present invention, however, is that it is possible to forgo such pretreatment of the electrically conductive substrate for at least partial coating, by phosphatizing with a metal phosphate such as zinc phosphate, for example, or by means of chromating. In one preferred embodiment, therefore, the electrically conductive substrate used in accordance with the invention is not such a phosphate or chromate substrate.

Prior to being coated with the aqueous coating composition (A) of the invention, the electrically conductive substrate used in accordance with the invention may be pretreated with an aqueous pretreatment composition which comprises at least one water-soluble compound containing at least one Ti atom and/or at least one Zr atom and which comprises at least one water-soluble compound as a source of fluoride ions, containing at least one fluorine atom, or with an aqueous pretreatment composition which comprises a water-soluble compound obtainable by reaction of at least one water-soluble compound containing at least one Ti atom and/or at least one Zr atom with at least one water-soluble compound as a source of fluoride ions, containing at least one fluorine atom.

The at least one Ti atom and/or the at least one Zr atom in this case preferably have the +4 oxidation state. By virtue of the components it contains and preferably by virtue, moreover, of the appropriately selected proportions of these components, the aqueous pretreatment composition preferably comprises a fluoro complex, such as a hexafluorometallate, i.e., in particular, hexafluorotitanate and/or at least one hexafluorozirconate. The pretreatment composition preferably has a total concentration of the elements Ti and/or Zr which is not below $2.5 \cdot 10^{-4}$ mol/L but is not greater than $2.0 \cdot 10^{-2}$ mol/L. The preparation of such pretreatment compositions and their use in the pretreatment of electrically conductive substrates are known from WO 2009/115504 A1, for example.

The pretreatment composition preferably further comprises copper ions, preferably copper(II) ions, and also, optionally, one or more water-soluble and/or water-dispersible compounds comprising at least one metal ion selected from the group consisting of Ca, Mg, Al, B, Zn, Mn and W, and also mixtures thereof, preferably at least one aluminosilicate, and more particularly one having an atomic ratio of Al to Si atoms of at least 1:3. The preparation of such pretreatment compositions and their use in the pretreatment of electrically conductive substrates are known from WO 2009/115504 A1, for example. The aluminosilicates are present preferably in the form of nanoparticles having a particle size in the range from 1 to 100 nm as determinable by dynamic light scattering. The average particle size for such nanoparticles, in the range from 1 to 100 nm, as determinable by dynamic light scattering, is determined in accordance with DIN ISO 13321 (date: Oct. 1, 2004).

In one preferred embodiment, however, the electrically conductive substrate used in accordance with the invention is a substrate which has not been pretreated with any such pretreatment composition.

Component (A1) and Optional Component (A2)

The aqueous coating composition (A) used in accordance with the invention comprises at least one cathodically depositable binder as component (A1) and optionally at least one crosslinking agent as component (A2).

The term "binder" as part of the coating composition (A) encompasses for the purposes of the present invention preferably the cathodically depositable polymeric resins, those responsible for film-forming, of the aqueous coating composition (A) used in accordance with the invention, although any crosslinking agent present is not included in the concept of the binder. A "binder" in the sense of the present invention is therefore a polymeric resin, although any crosslinking agent present is not included in the concept of the binder. In particular, moreover, any pigments and fillers present are not subsumed within the concept of the binder. Preferably, moreover, the optional component (A5) is not subsumed by the concept of the binder if said component comprises a polymeric complexing agent.

The coating composition (A) used in accordance with the invention is preferably prepared using an aqueous dispersion or aqueous solution, more preferably at least one aqueous dispersion, which comprises the least one cathodically depositable binder (A1) and the optionally present at least one crosslinking agent (A2). This aqueous dispersion or solution comprising (A1) and optionally (A2) preferably has a nonvolatile fraction, i.e., a solids content, in a range from 25 to 60 wt %, more preferably in a range from 27.5 to 55 wt %, very preferably in a range from 30 to 50 wt %, more preferably still in a range from 32.5 to 45 wt %, more particularly in a range from 35 to 42.5 wt %, based in each case on the total weight of this aqueous dispersion or solution.

Methods for determining the solids content, in particular of eletrocoatings, are known to the skilled person. The solids content is determined preferably according to DIN EN ISO 3251 (date: Jun. 1, 2008), in particular over a duration of 30 minutes at 180° C. as per that standard.

The skilled person knows of cathodically depositable binders (A1). The inventively employed binder is preferably a binder dispersible or soluble in water.

All customary cathodically depositable binders known to the skilled person are suitable here as binder component (A1) of the aqueous coating composition (A) used in accordance with the invention.

The binder (A1) preferably has reactive functional groups which permit a crosslinking reaction. The binder (A1) here is self-crosslinking or an externally crosslinking binder, preferably an externally crosslinking binder. In order to permit a crosslinking reaction, therefore, the coating composition (A) preferably further includes at least one crosslinking agent (A2) as well as the at least one binder (A1).

The binder (A1) present in the coating composition (A), or the crosslinking agent (A2) optionally present, is preferably thermally crosslinkable. The binder (A1) and the crosslinking agent (A2) optionally present are preferably crosslinkable on heating to temperatures above room temperature, i.e., above 18-23° C. The binder (A1) and the crosslinking agent (A2) optionally present are preferably crosslinkable only at oven temperatures ≥80° C., more preferably ≥110° C., very preferably ≥130° C., and especially preferably ≥140° C.

With particular advantage the binder (A1) and the crosslinking agent (A2) optionally present are crosslinkable at 100 to 250° C., more preferably at 125 to 250° C., and very preferably at 150 to 250° C.

The coating composition (A) preferably comprises at least one binder (A1) which has reactive functional groups which permit a crosslinking reaction preferably in combination with at least one crosslinking agent (A2).

Any customary crosslinkable reactive functional group known to the skilled person is contemplated here. The binder (A1) preferably has reactive functional groups selected from the group consisting of optionally substituted primary amino groups, optionally substituted secondary amino groups, substituted tertiary amino groups, hydroxyl groups, thiol groups, carboxyl groups, groups which have at least one C═C double bond, such as vinyl groups or (meth)acrylate groups, for example, and epoxide groups, it being possible for the primary and secondary amino groups to be substituted by 1 or 2 or 3 substituents in each case independently of one another selected from the group consisting of $C_{1-6}$ aliphatic radicals such as methyl, ethyl, n-propyl or isopropyl, for example, and it being possible for these $C_{1-6}$ aliphatic radicals in turn to be substituted optionally by 1, 2, or 3 substituents in each case independently of one another selected from the group consisting of OH, $NH_2$, $NH(C_{1-6}$ alkyl), and $N(C_{1-6}$ alkyl$)_2$. Particularly preferred is at least one binder (A1) which has reactive functional groups selected from the group consisting of optionally substituted primary amino groups, optionally substituted secondary amino groups, and hydroxyl groups, it being possible for the primary and secondary amino groups to be substituted optionally by 1 or 2 or 3 substituents in each case independently of one another selected from the group consisting of $C_{1-6}$ aliphatic radicals such as methyl, ethyl, n-propyl, or isopropyl, for example, and it being possible for these $C_{1-6}$ aliphatic radicals in turn to be substituted optionally by 1, 2, or 3 substituents in each case independently of one another selected from the group consisting of OH, $NH_2$, $NH(C_{1-6}$ alkyl), and $N(C_{1-6}$ alkyl$)_2$. The reactive functional groups here, especially the optionally substituted primary and secondary amino groups, may optionally be present at least partly in protonated form.

With particular preference the binder (A1) has tertiary amino groups optionally present at least partly in protonated form, very preferably tertiary amino groups which in each case independently of one another have at least two $C_{1-3}$ alkyl groups each substituted at least singly by a hydroxyl group, more particularly having in each case independently of one another two hydroxyethyl groups, two hydroxypropyl groups, or one hydroxypropyl and one hydroxyethyl group, the binder (A1) preferably being at least one polymeric resin. Such binders may be obtained, for example, by a method which is described in JP 2011-057944 A.

The binder (A1) present in the coating composition (A) is preferably at least one acrylate-based polymeric resin and/or at least one epoxide-based polymeric resin, more particularly at least one cationic epoxide-based and amine-modified resin. The preparation of cationic, amine-modified, epoxide-based resins of this kind is known and is described in, for example, DE 35 18 732, DE 35 18 770, EP 0 004 090, EP 0 012 463, EP 0 961 797 B1, and EP 0 505 445 B1. Cationic epoxide-based amine-modified resins are understood preferably to be reaction products of at least one optionally modified polyepoxide, i.e., of at least one optionally modified compound having two or more epoxide groups, with at least one preferably water-soluble amine, preferably with at least one such primary and/or secondary amine. Particularly preferred polyepoxides are polyglycidyl ethers of polyphenols and are prepared from polyphenols and epihalohydrines. Polyphenols that may be used include, in particular, bisphenol A and/or bisphenol F. Other suitable polyepoxides are polyglycidyl ethers of polyhydric alcohols, such as ethylene glycol, diethylene glycol, triethylene glycol, 1,2-propylene glycol, 1,3-propylene glycol, 1,5-pentanediol, 1,2,6-hexanetriol, glycerol, and 2,2-bis(4-hydroxycyclohexyl)propane. Modified polyepoxides are those polyepoxides in which some of the reactive functional groups have undergone reaction with at least one modifying compound. Examples of such modifying compounds are as follows:

a) compounds containing carboxyl groups, such as saturated or unsaturated monocarboxylic acids (e.g., benzoic acid, linseed oil fatty acid, 2-ethylhexanoic acid, Versatic acid), aliphatic, cycloaliphatic and/or aromatic dicarboxylic acids of various chain lengths (e.g., adipic acid, sebacic acid, isophthalic acid, or dimeric fatty acids), hydroxyalkylcarboxylic acids (e.g., lactic acid, dimethylolpropionic acid), and carboxyl-containing polyesters, or b) compounds containing amino groups, such as diethylamine or ethylhexylamine or diamines having secondary amino groups, e.g., N,N'-dialkyl-alkylenediamines, such as dimethylethylenediamine, N,N'-dialkyl-polyoxyalkyleneamines, such as N,N'-dimethylpolyoxypropylenediamine, cyanalkylated alkylenediamines, such as bis-N,N'-cyanethyl-ethylenediamine, cyanalkylated polyoxyalkyleneamines, such as bis-N,N'-cyanethylpolyoxypropylenediamine, polyaminoamides, such as Versamides, for example, especially amino-terminated reaction products of diamines (e.g., hexamethylenediamine), polycarboxylic acids, especially dimer fatty acids, and monocarboxylic acids, especially fatty acids, or the reaction product of one mole of diaminohexane with two moles of monoglycidyl ether, or monoglycidyl esters, especially glycidyl esters of α-branched fatty acids, such as of Versatic acid, or c) compounds containing hydroxyl groups, such as neopentyl glycol, bisethoxylated neopentyl glycol, neopentyl glycol hydroxypivalate, dimethylhydantoin-N-N'-diethanol, hexane-1,6-diol, hexane-2,5-diol, 1,4-bis(hydroxymethyl)cyclohexane, 1,1-isopropylidenebis(p-phenoxy)-2-propanol, trimethylolpropane, pentaerythritol, or amino alcohols, such as triethanolamine, methyldiethanolamine, or hydroxyl-containing alkylketimines, such as aminomethylpropane-1,3-diol methyl isobutylketimine or tris(hydroxymethyl)aminomethane cyclohexanone ketimine, and also polyglycol ethers, polyester polyols, polyether polyols, polycaprolactone polyols, polycaprolactam polyols of various functionalities and molecular weights, or d) saturated or unsaturated fatty acid methylesters, which are transesterified in the presence of sodium methoxide with hydroxyl groups of the epoxy resins.

Examples of amines which can be used are mono- and dialkylamines, such as methylamine, ethylamine, propylamine, butylamine, dimethylamine, diethylamine, dipropylamine, methylbutylamine, alkanolamines, such as methylethanolamine or diethanolamine, for example, and dialkylaminoalkylamines, such as dimethylaminoethylamine, diethylaminopropylamine, or dimethylaminopropylamine, for example. The amines that can be used may also contain other functional groups as well, provided these groups do not disrupt the reaction of the amine with the epoxide group of the optionally modified polyepoxide and also do not lead to gelling of the reaction mixture. Secondary amines are preferably used. The charges which are needed for dilutability with water and for electrical deposition may be generated by protonation with water-soluble acids (e.g., boric acid, formic acid, acetic acid, lactic acid, preferably acetic acid). A further possibility for introducing cationic groups into the optionally modified polyepoxide lies in the reaction of epoxide groups in the polyepoxide with amine salts.

Besides the at least one cathodically depositable binder (A1), the coating composition (A) preferably comprises at least one crosslinking agent (A2) which permits a crosslinking reaction with the reactive functional groups of the binder (A1)

All customary crosslinking agents (A2) known to the skilled person may be used, such as phenolic resins, polyfunctional Mannich bases, melamine resins, benzoguanamine resins, epoxides, free polyisocyanates and/or blocked polyisocyanates, particularly blocked polyisocyanates.

A particularly preferred crosslinking agent (A2) is a blocked polyisocyanate. Blocked polyisocyanates which can be utilized are any polyisocyanates such as diisocyanates, for example, in which the isocyanate groups have been reacted with a compound and so the blocked polyisocyanate formed is stable in particular with respect to hydroxyl and amino groups, such as primary and/or secondary amino groups, at room temperature, i.e., at a temperature of 18 to 23° C., but reacts at elevated temperatures, as for example at ≥80° C., more preferably ≥110° C., very preferably ≥130° C., and especially preferably ≥140° C., or at 90° C. to 300° C. or at 100 to 250° C., more preferably at 125 to 250° C., and very preferably at 150 to 250° C.

In the preparation of the blocked polyisocyanates it is possible to use any desired organic polyisocyanates that are suitable for crosslinking. Isocyanates used are preferably (hetero) aliphatic, (hetero) cycloaliphatic, (hetero)aromatic, or (hetero)aliphatic-(hetero)aromatic isocyanates.

Preferred are diisocyanates which contain 2 to 36, more particularly 6 to 15, carbon atoms. Preferred examples are 1,2-ethylene diisocyanate, 1,4-tetramethylene diisocyanate, 1,6-hexamethylene diisocyanate (HDI), 2,2,4(2,4,4)-trimethyl-1,6-hexamethylene diisocyanate (TMDI), diphenylmethane diisocyanate (MDI), 1,9-diisocyanato-5-methylnonane, 1,8-diisocyanato-2,4-dimethyloctane, 1,12-dodecane diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl-1,4-methanonaphthalen-2 (or 3),5-ylenedimethylene diisocyanate, hexahydro-4,7-methano-indan-1 (or 2),5 (or 6)-ylenedimethylene diisocyanate, hexahydro-4,7-methanoindan-1 (or 2),5 (or 6)-ylene diisocyanate, 2,4- and/or 2,6-hexahydrotolylene diisocyanate (H6-TDI), 2,4- and/or 2,6-tolylene diisocyanate (TDI), perhydro-2,4'-diphenylmethane diisocyanate, perhydro-4,4'-diphenylmethane diisocyanate ($H_{12}$MDI), 4,4'-diisocyanato-3,3',5,5'-tetramethyldicyclohexylmethane, 4,4'-diisocyanato-2,2',3,3',5,5',6,6'-octamethyldicyclohexylmethane, ω,ω'- diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, 2,5(2,6)-bis(isocyanatomethyl)bicyclo[2.2.1]heptane (NBDI), and also any mixture of these compounds. Polyisocyanates of higher isocyanate functionality may also be used. Examples thereof are trimerized hexamethylene diisocyanate and trimerized isophorone diisocyanate. Furthermore, mixtures of polyisocyanates may also be utilized. The organic polyisocyanates contemplated as crosslinking agents (A2) for the invention may also be prepolymers, deriving, for example, from polyol, including from a polyether polyol or a polyester polyol. Especially preferred are 2,4-toluene diisocyanate and/or 2,6-toluene diisocyanate (TDI), and/or isomer mixtures of 2,4-toluene diisocyanate and 2,6-toluene diisocyanate, and/or diphenylmethane diisocyanate (MDI).

Used preferably for the blocking of polyisocyanates may be any desired suitable aliphatic, cycloaliphatic, or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl, and lauryl alcohol; cycloaliphatic alcohols such as cyclopentanol and cyclohexanol; aromatic alkyl alcohols, such as phenylcarbinol and methylphenylcarbinol. Other suitable blocking agents are hydroxylamines, such as ethanolamine, oximes, such as methyl ethyl ketone oxime, acetone oxime, and cyclohexanone oxime, and amines, such as dibutylamine and diisopropylamine.

The relative weight ratio of the at least one binder (A1) to the optionally present least one crosslinking agent (A2) in the coating composition (A) used in accordance with the invention is preferably in a range from 4:1 to 1.1:1, more preferably in a range from 3:1 to 1.1:1, very preferably in a range from 2.5:1 to 1.1:1, more particularly in a range from 2.1:1 to 1.1:1, based in each case on the solids content of the at least one binder (A1) and of the at least one crosslinking agent (A2) in the coating composition (A).

In another preferred embodiment, the relative weight ratio of the at least one binder (A1) to the optionally present least one crosslinking agent (A2) in the coating composition (A) used in accordance with the invention is in a range from 4:1 to 1.5:1, more preferably in range from 3:1 to 1.5:1, very preferably in a range from 2.5:1 to 1.5:1, more particularly in a range from 2.1:1 to 1.5:1, based in each case on the solids content of the at least one binder (A1) and of the at least one crosslinking agent (A2) in the coating composition (A).

Coating Composition (A)

The aqueous coating composition (A) of the invention is suitable for at least partly coating an electrically conductive substrate with an electrocoat material, meaning that it is apt to be applied at least partly in the form of an electrocoat to the substrate surface of an electrically conductive substrate. Preferably the entire aqueous coating composition (A) of the invention is cathodically depositable.

The aqueous coating compositions (A) of the invention comprise water as liquid diluent.

The term "aqueous" in connection with the coating composition (A) refers preferably to liquid coating compositions (A) which comprise water as the main component of their liquid diluent, i.e., as liquid solvent and/or dispersion medium. Optionally, however, the coating compositions (A) may include at least one organic solvent in minor fractions. Examples of such organic solvents include heterocyclic, aliphatic or aromatic hydrocarbons, mono- or polyhydric alcohols, especially methanol and/or ethanol, ethers, esters, ketones, and amides, such as, for example, N-methylpyrrolidone, N-ethylpyrrolidone, dimethyl-formamide, toluene, xylene, butanol, ethyl glycol and butyl glycol and also their acetates, butyl diglycol, diethylene glycol dimethyl ether, cyclohexanone, methyl ethyl ketone, methylisobutyl ketone, acetone, isophorone, or mixtures thereof. The fraction of these organic solvents is preferably not more than 20.0 wt %, more preferably not more than 15.0 wt %, very preferably not more than 10.0 wt %, more particularly not more than 5.0 wt % or not more than 4.0 wt % or not more than 3.0 wt %, more preferably still not more than 2.5 wt % or not more than 2.0 wt % or not more than 1.5 wt %, most preferably not more than 1.0 wt % or not more than 0.5 wt %, based in each case on the total fraction of the liquid diluents—i.e., liquid solvents and/or dispersion media—that are present in coating composition (A).

Fractions in % by weight of all components included in the coating composition (A) of the invention, in other words the fractions of (A1), bismuth, in particular in the form of (A3) and/or (A4) and with at least one amine-blocked compound (P), and water, and also, optionally, of (A2) and the optional components (A5), (A6) and/or (A7) and/or (A8) and also of organic solvents optionally present, add up preferably to 100 wt %, based on the total weight of the coating composition (A).

The aqueous coating composition (A) preferably has a solids content in the range from 5 to 45 wt %, more preferably in the range from 7.5 to 35 wt %, very preferably from 10 to 30 wt %, more preferably still in the range from 12.5 to 25 wt % or in the range from 15 to 30 wt % or in the range from 15 to 25 wt %, more particularly from 17 to 22 wt %, based in each case on the total weight of the aqueous coating composition (A). Methods for determining the solids content, in particular of electrocoatings, are known to the skilled person. The solids content is determined preferably according to DIN EN ISO 3251 (date: Jun. 1, 2008).

The aqueous coating composition (A) used in accordance with the invention is preferably an aqueous dispersion or solution, preferably an aqueous dispersion.

The coating composition (A) of the invention preferably has a pH in a range from 4.0 to 6.5. The coating composition (A) used in accordance with the invention particularly preferably has a pH in the range from 4.2 to 6.5, more particularly in the range from 4.4 to 6.5 or in the range from 4.6 to 6.5, especially preferably in the range from 4.8 to 6.4, most preferably in the range from 5.0 to 6.2 or 5.2 to 6 or 5.5 to 6.0. Methods for adjusting pH levels in aqueous compositions are known to the skilled person. The desired pH is preferably set by addition of at least one acid, more preferably at least one inorganic and/or at least one organic acid. Examples of suitable inorganic acids are hydrochloric acid, sulfuric acid, phosphoric acid and/or nitric acid. An example of a suitable organic acid is propionic acid, lactic acid, acetic acid and/or formic acid. Alternatively or additionally and also preferably it is possible as well to use the at least one component (A5) optionally present in the coating composition (A) for adjusting the pH level, provided said component is suitable for the purpose, i.e., has for example at least one deprotonatable functional group such as a carboxyl group and/or a phenolic OH group, for example.

Total Amount of Bismuth and Components (A3) and/or (A4)

The coating composition (A) comprises a total amount of at least 30 ppm of bismuth, based on the total weight of the coating composition (A).

The total amount of bismuth present in the coating composition (A) is preferably at least 50 ppm or at least 100 ppm or at least 130 ppm or at least 150 ppm or at least 175 ppm or at least 200 ppm, more preferably at least 300 ppm, very preferably at least 500 or at least 750 ppm, more particularly at least 1000 ppm or at least 1500 ppm or at least 2000 ppm, based in each case on the total weight of the coating composition (A). The total amount of bismuth present in the coating composition (A) is preferably in each case not more than 20 000 ppm, more preferably not more than 15 000 ppm, very preferably not more than 10 000 ppm or not more than 7500 ppm, more particularly not more than 5000 ppm or not more than 4000 ppm, based in each case on the total weight of the coating composition (A). The total amount of bismuth present in the coating composition (A), based on the total weight of the aqueous coating composition (A), is preferably in a range from 30 ppm to 20 000 ppm, more preferably in a range from 50 ppm to 15 000 ppm, very preferably in a range from 100 ppm to 10 000 ppm or in a range from 130 ppm to 10 000 ppm, especially preferably in a range from 500 ppm to 10 000 ppm or in a range from 500 to 20 000 ppm or in a range from 1000 ppm to 10 000 ppm or in a range from 1000 ppm to 5000 ppm or in a range from 500 ppm to 3000 ppm. The amount of bismuth, calculated as metal, may be determined by means of the method (ICP-OES) hereinafter: both the total amount of bismuth and also the function of (A3) and (A4) can be determined here.

The term "bismuth" in relation to the total amount bismuth in the coating composition (A) and particularly optionally in component (A3) and also, optionally, (A4) is understood in the sense of the present invention to refer preferably to bismuth atoms optionally with a charge, such as positively charged cationic bismuth atoms, for example, of different valences. The bismuth in this case may be in trivalent form (Bi(III)), but alternatively or additionally may also be present in other oxidation states. The amount of bismuth is calculated as bismuth metal in each case here.

The total amount of bismuth present in the coating composition (A) may include only that bismuth which is present in a form (A3) in which it is in solution in the coating composition (A). The total amount of bismuth present in the coating composition (A) may alternatively include bismuth which is present not only in a form (A3) in which it is in solution in the coating composition (A) but also in a form (A4) in which it is not in solution in the coating composition (A). Preferably at least part of the total amount of the bismuth present in the coating composition (A) is present in a form (A3) in which it is in solution in the coating composition (A).

The total amount of bismuth present in the coating composition (A) is preferably in each case the sum total of (A3) and (A4). In another preferred embodiment, the total amount of bismuth present in the coating composition (A) corresponds to the amount of component (A3).

If the coating composition (A) additionally comprises a component (A5), then components (A3) and (A5) are preferably in the form of a complex and/or salt of components (A3) and (A5) in the coating composition (A). If the total amount of bismuth corresponds to the amount of component (A3), then the at least 30 ppm of bismuth, which are then present in a form in solution as component (A3) in the coating composition (A), are therefore preferably present together with component (A5) in the form of a bismuth compound in solution in the coating composition (A), more particularly in the form of at least one dissolved salt and/or of a complex of components (A3) and (A5). Alternatively and/or additionally, for example, component (A3) may also be in the form of hydrated trivalent bismuth.

As component (A3) there is preferably at least some trivalent bismuth. It may be in hydrated form and/or in the form of at least one dissolved salt and/or of a complex, in particular together with (A5).

The term "in a form present in solution" in connection with component (A3) of the coating composition (A) of the invention means preferably that component (A3) is present in a form in solution in the aqueous coating composition (A) to an extent of at least 95 mol % or at least 97.5 mol %, more preferably at least 99 mol % or at least 99.5 mol %, very preferably at least 99.8 mol % or at least 99.9 mol %, more particularly at 100 mol %, based on the total amount of this component (A3) in the coating composition (A). Component (A3) is therefore preferably water-soluble. Component (A3) is preferably present in a form in solution in the coating composition (A) at least at a coating-composition (A) temperature in a range from 18 to 40° C.

Component (A3) is preferably obtainable from at least one bismuth compound selected from the group consisting of oxides, basic oxides, hydroxides, carbonates, nitrates, basic nitrates, salicylates, and basic salicylates of bismuth, and also mixtures thereof. At least one such bismuth compound is partly reacted preferably in water and preferably in the presence of at least one complexing agent (A5), to give component (A3).

To prepare the aqueous coating composition (A), preferably at least one component (A5) in the form of an aqueous solution is reacted with at least one bismuth compound selected from the group consisting of oxides, basic oxides, hydroxides, carbonates, nitrates, basic nitrates, salicylates, and basic salicylates of bismuth, and also mixtures thereof, to give an aqueous solution or dispersion or suspension, preferably solution, optionally after filtration, of the reaction product of (A5) and the bismuth compound, and this preferably water-soluble reaction product is used for preparing the coating composition (A) used in accordance with the invention.

With particular preference, to prepare the aqueous coating composition (A), at least one component (A5) selected from the group consisting of lactic acid and dimethylpropionic acid is reacted in the form of an aqueous solution with at least one of the aforementioned bismuth compounds, preferably with bismuth(III) oxide, to give an aqueous solution or dispersion or suspension, preferably solution, optionally after filtration, of the reaction product of (A5) and the bismuth compound, and this preferably water-soluble reaction product is used for preparing the coating composition (A) used in accordance with the invention.

If, besides (A3), the coating composition of the invention additionally comprises component (A4), then (A) preferably comprises a total amount of at least 130 ppm of bismuth, based on the total weight of the coating composition (A), including (A3) at least 130 ppm of bismuth, based on the total weight of the coating composition (A), in a form in which it is in solution in the coating composition (A), or (A3) at least 30 ppm of bismuth, based on the total weight of the coating composition (A), in a form in which it is in solution in the coating composition (A), and (A4) at least 100 ppm of bismuth, based on the total weight of the coating composition (A), in a form in which it is not in solution in the coating composition (A).

The at least 100 ppm of bismuth which, in this embodiment, are present in a form not in solution as component (A4) in the coating composition (A) are present preferably in the form of a bismuth compound which is not in solution in the coating composition (A), more particularly in the form of at least one undissolved bismuth salt, hydroxide and/or oxide.

The fraction of component (A4) within the total amount of the bismuth present in the coating composition (A), i.e., based on the total amount of the bismuth present in the coating composition (A) in moles, is preferably at least 10 mol %, more preferably at least 20 mol %, or at least 30 mol %, very preferably at least 40 mol % or at least 50 mol % or at least 60 mol % or at least 70 mol %. The fraction of component (A4) within the total amount of the bismuth present in the coating composition (A) is preferably in each case not more than 98 mol %, very preferably not more than 97 mol % or not more than 96 mol %, especially preferably not more than 95 mol %.

The mol % fraction of component (A4) within the total amount of bismuth present in the coating composition (A) is preferably greater than the mol % fraction of component (A3).

The term "present in a form not in solution" in connection with component (A4) of the coating composition (A) of the invention means preferably that component (A4) is present in a form not in solution in the aqueous coating composition (A) to an extent of at least 95 mol % or at least 97.5 mol %, more preferably at least 99 mol % or at least 99.5 mol %, very preferably at least 99.8 mol % or at least 99.9 mol %, more particularly at 100 mol %, based on the total amount of this component (A4) in the coating composition (A). Component (A4) is therefore preferably water-insoluble. Component (A4) is preferably present in a form not in solution in the coating composition (A) at least at a coating-composition (A) temperature in a range from 18 to 40° C.

Preferably the coating composition (A) comprises a total amount of at least 300 ppm of bismuth, based on the total weight of the coating composition (A), including (A3) at least 300 ppm of bismuth, based on the total weight of the coating composition (A), in a form in which it is in solution in the coating composition (A), or (A3) at least 100 ppm of bismuth, based on the total weight of the coating composition (A), in a form in which it is in solution in the coating composition (A), and (A4) at least 200 ppm of bismuth, based on the total weight of the coating composition (A), in a form in which it is not in solution in the coating composition (A).

More preferably the coating composition (A) comprises a total amount of at least 400 ppm of bismuth, based on the total weight of the coating composition (A), including (A3) at least 400 ppm of bismuth, based on the total weight of the coating composition (A), in a form in which it is in solution in the coating composition (A), and or (A3) at least 150 ppm of bismuth, based on the total weight of the coating composition (A), in a form in which it is in solution in the coating composition (A), and (A4) at least 250 ppm of bismuth, based on the total weight of the coating composition (A), in a form in which it is not in solution in the coating composition (A).

Very preferably the coating composition (A) comprises a total amount of at least 500 ppm of bismuth, based on the total weight of the coating composition (A), including (A3) at least 500 ppm of bismuth, based on the total weight of the coating composition (A), in a form in which it is in solution in the coating composition (A), and or (A3) at least 200 ppm of bismuth, based on the total weight of the coating composition (A), in a form in which it is in solution in the coating composition (A), and (A4) at least 300 ppm of bismuth, based on the total weight of the coating composition (A), in a form in which it is not in solution in the coating composition (A).

The coating composition (A) of the invention is obtainable preferably by at least partly, preferably completely, converting least one water-insoluble bismuth compound, preferably selected from the group consisting of oxides, basic oxides, hydroxides, carbonates, nitrates, basic nitrates, salicylates, and basic salicylates of bismuth, and also mixtures thereof, by at least partial, preferably complete, reaction of this compound with at least one at least bidentate complexing agent (A5) suitable for the complexing of bismuth, into at least one water-insoluble bismuth compound (A3) in water, optionally in the presence of at least one component (A6) to (A8), and/or (P) blocked with at least one amine, and optionally in the presence of (A1) and/or (A2), to give a mixture comprising at least components (A3) and (A5) and also optionally, at least one of components (A4) and/or (A6) to (A8) and/or optionally (A1) and/or (A2) and/or the compound (P) blocked with at least one amine, of the coating composition (A), and optionally mixing the resulting mixture at least with component (A1) and optionally with component (A2), optionally in the presence of at least one of components (A6) to (A8) and/or compound (P) blocked with at least one amine, to give the coating composition (A).

The water-insoluble bismuth compound used is optionally part of a pigment paste comprising at least one pigment (A6), especially if (A) comprises component (A4).

If the total amount of bismuth in (A) corresponds to the amount of component (A3), then the aqueous coating composition (A) is preferably prepared by reacting at least one component (A5) in the form of an aqueous solution with at least one water-insoluble bismuth compound, selected preferably from the group consisting of oxides, basic oxides, hydroxides, carbonates, nitrates, basic nitrates, salicylates, and basic salicylates of bismuth, and also mixtures thereof, and mixing the resulting, (A3)-comprising aqueous solution of the reaction product of (A5) and this bismuth compound with at least with component (A1) and optionally (A2) and also with the compound (P) blocked with at least one amine, and optionally with at least one of components (A6) to (A8), to give the aqueous coating composition (A).

Optional Component (A5)

The coating composition (A) of the invention preferably comprises at least one at least bidentate complexing agent suitable for complexing bismuth, as component (A5), the at least one complexing agent (A5) being present in the aqueous coating composition (A) preferably in a fraction of at least 5 mol %, based on the total amount of bismuth present in the coating composition (A).

Component (A5) here is suitable for complexing both (A3) and (A4). Preferably, the at least one complexing agent (A5) is suitable for forming salts and/or complexes with component (A3) present in the aqueous coating composition (A).

Particularly suitable as component (A5) are complexing agents which are capable of converting bismuth in water into a form (A3) which is soluble in the coating composition (A), preferably at temperatures in the range from 10 to 90° C. or in the range from 20 to 80° C., more preferably in the range from 30 to 75° C.

In the aqueous coating composition (A), the at least one complexing agent (A5) is present preferably in a fraction of at least 7.5 mol % or at least 10 mol %, more preferably in a fraction of at least 15 mol % or at least 20 mol %, very preferably in a fraction of at least 30 mol % or at least 40 mol %, more particularly in a fraction of at least 50 mol %, based in each case on the total amount of bismuth present in the coating composition (A). The respective amount of the complexing agent (A5) used in accordance with the invention is dependent, for example, on the denticity of (A5) and/or on the complexing strength of (A5). The at least one complexing agent (A5) is present, however, in the aqueous coating composition (A) in a fraction which ensures that at least 30 ppm and preferably at least 130 ppm of bismuth, based on the total weight of the coating composition (A), is present in a form in which it is in solution in the coating composition (A).

The complexing agent (A5) is preferably not a binder component (A1) and in particular is also not used for preparing the binder (A1).

The complexing agent (A5) is at least bidentate. A skilled person knows of the concept of "denticity". The term refers to the number of possible bonds which can be formed by a molecule of complexing agent (A5) to the atom that is to be complexed, such as to the bismuth ion and/or bismuth atom that is to be complexed. Preferably (A5) is bidentate, tridentate or tetradentate, more particularly bidentate.

The complexing agent (A5) may take the form of an anion, such as an anion of an organic monocarboxylic or polycarboxylic acid, for example.

The complexing agent (A5) preferably has at least two donor atoms, i.e., at least two atoms having at least one free electron pair in the valence shell. Preferred donor atoms are selected from the group consisting of N, S, and O atoms, and also mixtures thereof. Particularly preferred complexing agents (A5) are those which have at least one oxygen donor atom and at least one nitrogen donor atom, or which have at least two oxygen donor atoms. Especially preferred complexing agents (A5) are those having at least two oxygen donor atoms.

Where O and/or S donor atoms are present in the complexing agent (A5), each of these at least two donor atoms is preferably bonded to another, carrier atom, such as a carbon atom, which is not itself a donor atom. Where at least two N donor atoms are present in the complexing agent (A5), each of these at least two N donor atoms may be bonded to the same carrier atom, which is not itself a donor atom, as in the case of guanidine or urea, for example.

Where O and/or S donor atoms are present in the complexing agent (A5), such as at least two O donor atoms, for example, and where each of these at least two donor atoms is bonded to another carrier atom, such as to a carbon atom, which is not itself a donor atom, these at least two carrier atoms may be bonded directly to one another, i.e., may be adjacent, as in the case of oxalic acid, lactic acid, bicine (N,N'-bis(2-hydroxyethyl)glycine), EDTA, or α-amino acids, for example. Two donor atoms, the two carrier atoms bonded to one another, and the ion and/or atom to be complexed may then form a five-membered ring. The two carrier atoms may alternatively be bridged with one another via a single further atom, as in the case of acetylacetonate or, with regard to the phosphorus atoms as carrier atoms, in 1-hydroxyethane-1,1-diphosphonic acid, for example. Two donor atoms, the two carrier atoms, the atom bridging these carrier atoms, and the ion and/or atom to be complexed may in that case form a six-membered ring. The at least two carrier atoms may be joined to one another, furthermore, by two further atoms, as in the case of maleic acid, for example. Where there is a double bond between the two atoms that join the carrier atoms to one another, then the two carrier atoms must be in cis-position relative to one another, in order to allow the formation of a seven-membered ring with the ion and/or atom to be complexed. Where two carrier atoms are part of an aromatic system or where these carrier atoms are joined to one another by up to two further carrier atoms, preference is given to locations in the aromatic system in 1,2- and 1,3-position, such as in the case of gallic acid, of Tiron, of salicylic acid, or of phthalic acid, for example. Furthermore, the donor atoms may also themselves be part of an aliphatic or aromatic ring system, as in the case of 8-hydroxyquinoline, for example.

Especially preferred complexing agents (A5) are those having at least two oxygen donor atoms. In this case, at least one of the oxygen donor atoms may have a negative charge, as in the case of acetylacetonate, for example, or may be part of an acid group, such as of a carboxylic acid group, phosphonic acid group, or sulfonic acid group, for example. Optionally it is possible, as well or alternatively, for the oxygen atom of the acid group to carry a negative charge, such as on deprotonation and formation of a carboxylate group, phosphonate, or sulfonate group.

If at least one donor atom is an N atom, then a further donor atom is preferably an O atom which carries a negative charge, or is part of an acid group (carboxylic acid, phosphonic acid, sulfonic acid, etc.).

Where (A5) has only N atoms as donor atoms, this component may also be present as an anion, as in the case of 1,2- or 1,3-dioxime anions, for example. Preferred carrier atoms in this case are C atoms. N atoms as donor atoms are preferably in the form of primary, secondary, or tertiary amino groups or are present as oxime groups.

If (A5) has only S atoms and/or O atoms as donor atoms, then preferred carrier atoms in this case are C atoms, S atoms, and P atoms, more particularly C atoms. O atoms as donor atoms are preferably present at least proportionally in anionic form (e.g., acetylacetonate) or in the form of carboxylate groups, phosphonate groups, or sulfonate groups. S atoms as donor atoms are present preferably in the form of thiols, such as in cysteine, for example.

The complexing agent (A5) is preferably selected from the group consisting of nitrogen-free, preferably at least singly hydroxyl-substituted organic monocarboxylic acids, nitrogen-free, optionally at least singly hydroxyl-substituted organic polycarboxylic acids, optionally at least singly hydroxyl-substituted aminopolycarboxylic acids, optionally at least singly hydroxyl-substituted aminomonocarboxylic acids, and sulfonic acids, and also the anions of each of these, and, moreover, preferably optionally at least singly hydroxyl-substituted monoamines and optionally at least singly hydroxyl-substituted polyamines, and chemical compounds which contain at least two O donor atoms and do not fall within the compounds stated within this enumeration, such as 8-hydroxyquinoline and acetylacetone, for example.

An example of a suitable complexing agent (A5) is at least one organic monocarboxylic or polycarboxylic acid which has preferably no nitrogen atom(s), and/or anions thereof.

The term "polycarboxylic acid" in the sense of the present invention refers preferably to a carboxylic acid which has two or more carboxyl groups, as for example 2, 3, 4, 5, or 6 carboxyl groups. More preferably the polycarboxylic acid has 2 or 3 carboxyl groups. Polycarboxylic acids having two carboxyl groups are dicarboxylic acids, and polycarboxylic acids having three carboxyl groups are tricarboxylic acids. The polycarboxylic acids used in accordance with the invention may be aromatic, partly aromatic, cycloaliphatic, partly cycloaliphatic or aliphatic, preferably aliphatic. The polycarboxylic acids used in accordance with the invention preferably have 2 to 64 carbon atoms, more preferably 2 to 36, more particularly 3 to 18 or 3 to 8 carbon atoms. Examples of polycarboxylic acids are oxalic acid, malonic acid, succinic acid, glutaric acid, adipic acid, tartaric acid, citric acid, mucic acid, and malic acid.

The term "monocarboxylic acid" in the sense of the present invention refers preferably to a preferably aliphatic monocarboxylic acid which has exactly one —C(=O)—OH group. The monocarboxylic acids used in accordance with the invention preferably have 1 to 64 carbon atoms, more preferably 1 to 36, more particularly 2 to 18 or 3 to 8 carbon atoms. The monocarboxylic acid here preferably has at least one hydroxyl group.

Where complexing agent (A5) used comprises at least one organic monocarboxylic or polycarboxylic acid which preferably has no nitrogen atom(s), and/or anions thereof, the at least one organic monocarboxylic or polycarboxylic acid and/or anions thereof preferably has at least one carboxyl group and/or carboxylate group which is bonded to an organic radical having 1-8 carbon atoms, it being possible for the organic radical to be substituted optionally by at least one, preferably at least one or at least two, substituents selected from the group consisting of hydroxyl groups, ester groups, and ether groups.

The organic monocarboxylic or polycarboxylic acid is preferably selected from the group consisting of monocarboxylic and polycarboxylic acids and/or anions thereof that have, in α-, β-, or γ-position to the at least one carboxyl group and/or carboxylate group, one or two alcoholic hydroxyl group(s) or ester group(s) or ether group(s). Examples of such acids are as follows: glycolic acid (hydroxyacetic acid), lactic acid, γ-hydroxypropionic acid, α-methylolpropionic acid, α,α'-dimethylolpropionic acid, tartaric acid, hydroxyphenylacetic acid, malic acid, citric acid, and sugar acids such as, for example, gluconic acid and mucic acid. Cyclic or aromatic carboxylic acids are likewise suitable if the arrangement of the hydroxyl, ester, or ether groups with respect to the carboxyl group is such that it is possible for complexes to form. Examples of such are salicylic acid, gallic acid, hydroxybenzoic acid, and 2,4-dihydroxybenzoic acid. Examples of suitable carboxylic acids with an ether group or ester group are methoxyacetic acid, methyl methoxyacetate, isopropyl methoxyacetate, dimethoxyacetic acid, ethoxyacetic acid, propoxyacetic acid, butoxyacetic acid, 2-ethoxy-2-methylpropanoic acid, 3-ethoxypropanoic acid, butoxypropanoic acid and the esters thereof, butoxybutyric acid, and α- or β-methoxypropionic acid. Optically active carboxylic acids such as lactic acid may be used in the L-form, in the D-form, or as the racemate. Preference is given to using lactic acid (in optically active form, preferably as L-form, or as racemate) and/or dimethylolpropionic acid.

It is possible as well, however, to use organic monocarboxylic or polycarboxylic acids and/or anions thereof as complexing agents (A5) that have nitrogen atoms, especially aminomonocarboxylic acids and/or aminopolycarboxylic acids, and/or their anions.

The term "aminopolycarboxylic acid" in the sense of the present invention refers preferably to a carboxylic acid which has two or more carboxyl groups, as for example 2, 3, 4, 5, or 6 carboxyl groups, and also has at least one amino group, as for example at least one primary and/or secondary and/or tertiary amino group, more particularly at least one or at least two tertiary amino groups. The aminopolycarboxylic acids used in accordance with the invention preferably have 2 to 64 carbon atoms, more preferably 2 to 36, more particularly 3 to 18 or 3 to 8 carbon atoms. Examples of aminopolycarboxylic acids are ethylenediaminetetraacetic acid (EDTA), diethylenetriaminepentaacetic acid (DTPA), nitrilotriacetic acid (NTA), aspartic acid, methylglycidinediacetic acid (MGDA), β-alaninediacetic acid (β-ADA), imidosuccinate (IDS), hydroxyethyleneiminodiacetate (HEIDA), and N-(2-hydroxyethyl)ethylenediamine-N,N,N'-triacetic acid (HEDTA)

The term "aminomonocarboxylic acid" refers in the sense of the present invention preferably to a carboxylic acid which has exactly one carboxyl group and, moreover, has at least one amino group, as for example at least one primary and/or secondary and/or tertiary amino group, more particularly at least one or at least two tertiary amino groups. The aminomonocarboxylic acids used in accordance with the invention preferably have 2 to 64 carbon atoms, more preferably 2 to 36, more particularly 3 to 18 to 3 to 8 carbon atoms. This aminomonocarboxylic acid preferably has at least one hydroxyl group. One example of an aminomonocarboxylic acid is bicine (N,N'-bis(2-hydroxyethyl)glycine). Other examples are glycine, alanine, lysine, cysteine, serine, threonine, asparagine, β-alanine, 6-aminocaproic acid, leucine and dihydroxyethylglycine (DHEG), and also pantothenic acid.

Another example of a suitable complexing agent (A5) is at least one polyamine or monoamine.

The term "polyamine" refers in the sense of the present invention preferably to a compound which has at least two amino groups such as primary or secondary or tertiary amino groups. The amino groups may also take the form of oxime groups total, however, a polyamine may preferably have up to and including 10 amino groups—that is, in addition to the at least two amino groups, up to and including 8 further amino groups, i.e., 1, 2, 3, 4, 5, 6, 7, or 8, preferably up to and including 5, further amino groups, these preferably being primary or secondary or tertiary amino groups. The polyamine is preferably a diamine or triamine, more preferably a diamine. The polyamines used in accordance with the invention preferably have 2 to 64 carbon atoms, more preferably 2 to 36, more particularly 3 to 18 or 3 to 8 carbon atoms. At least one of the carbon atoms is preferably substituted by a hydroxyl group. Particularly preferred, accordingly, are hydroxyalkylpolyamines. Examples of polyamines are N,N,N',N'-tetrakis-2-hydroxyethylethylenediamine (THEED), N,N,N',N'-tetrakis-2-hydroxypropylethylene-diamine (Quadrol), guanidine, diethylenetriamine and diphenyl carbazide, and also diacetyldioxime.

The term "monoamine" refers in the sense of the present invention preferably to a preferably aliphatic monoamine which has exactly one amino group, such as, for example, exactly one primary or secondary or, in particular, tertiary amino group. The monoamines used in accordance with the invention preferably have 1 to 64 carbon atoms, more preferably 1 to 36, more particularly 2 to 18 or 3 to 8 carbon atoms. This monoamine preferably has at least one hydroxyl group. One example of a monoamine is triisopropanolamine.

Additionally suitable as complexing agent (A5), for example, is at least one sulfonic acid. Examples of suitable sulfonic acids are taurin, 1,1,1-trifluoromethanesulfonic acid, Tiron, and amidosulfonic acid.

The molar fraction of any at least one amino polycarboxylic acid present in the aqueous coating composition (A), more particularly of aminopolycarboxylic acid used as component (A5), is preferably lower by a factor of at least 15 or 20, more preferably by a factor of at least 30 or 40 or 50 or 60 or 70 or 80 or 90 or 100 or 1000, than the total amount of bismuth present in the aqueous coating composition (A), in moles, preferably based in each case on the total weight of the aqueous composition (A). The presence of such acids may possibly lead to problems with dipping bath stability and with wastewater treatment, as a result of accumulation of these compounds within the dipping bath.

Further Optional Components of the Coating Composition (A)

Depending on desired application, moreover, the aqueous coating composition (A) used in accordance with the invention may comprise at least one pigment (A6).

A pigment (A6) of this kind, present in the aqueous coating composition (A), is preferably selected from the group consisting of organic and inorganic, color-imparting and extending pigments.

This at least one pigment (A6) may be present as part of the aqueous solution or dispersion which is used for preparing the coating composition (A) and which comprises the components (A1) and optionally (A2).

The at least one pigment (A6) may alternatively be incorporated into the coating composition (A), in the form of a further aqueous dispersion or solution, different from the one used. In this embodiment, the corresponding pigment-containing aqueous dispersion or solution may further comprise at least one binder. A dispersion or solution of this kind preferably further comprises component (A4).

Examples of suitable inorganic color-imparting pigments (A6) are white pigments such as zinc oxide, zinc sulfide, titanium dioxide, antimony oxide, or lithopone; black pigments such as carbon black, iron manganese black, or spinel black; chromatic pigments such as cobalt green or ultramarine green, cobalt blue, ultramarine blue or manganese blue, ultramarine violet or cobalt violet and manganese violet, red iron oxide, molybdate red, or ultramarine red; brown iron oxide, mixed brown, spinel phases and corundum phases; or yellow iron oxide, nickel titanium yellow, or bismuth vanadate. Examples of suitable organic color-imparting pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Examples of suitable extending pigments or fillers are chalk, calcium sulfate, barium sulfate, silicates such as talc or kaolin, silicas, hydroxides such as aluminum hydroxide or magnesium hydroxide, or organic fillers such as textile fibers, cellulose fibers, polyethylene fibers, or polymer powders; for further details, refer to Römpp Lexikon Lacke und Druckfarben, Georg Thieme Verlag, 1998, pages 250 ff., "Fillers".

The pigment content of the aqueous coating compositions (A) may vary according to intended use and according to the nature of pigments (A6). The amount, based in each case on the total weight of the aqueous coating composition (A), is preferably in the range from 0.1 to 30 wt % or in the range from 0.5 to 20 wt %, more preferably in the range from 1.0 to 15 wt %, very preferably in the range from 1.5 to 10 wt %, and more particularly in the range from 2.0 to 5.0 wt %, or in the range from 2.0 to 4.0 wt %, or in the range from 2.0 to 3.5 wt %.

Depending on desired application, the coating composition (A) may comprise one or more typically employed additives (A7). These additives (A7) are preferably selected from the group consisting of wetting agents, emulsifiers, which preferably do not contain component (AB), dispersants, surface-active compounds such as surfactants, flow control assistants, solubilizers, defoamers, rheological assistants, antioxidants, stabilizers, crystallization inhibitors, preferably heat stabilizers, in-process stabilizers, and UV and/or light stabilizers, catalysts, fillers, waxes, flexibilizers, plasticizers, and mixtures of the abovementioned additives. The additive content may vary very widely according to intensive use. The amount, based on the total weight of the aqueous coating composition (A), is preferably 0.1 to 20.0 wt %, more preferably 0.1 to 15.0 wt %, very preferably 0.1 to 10.0 wt %, especially preferably 0.1 to 5.0 wt %, and more particularly 0.1 to 2.5 wt %.

The at least one additive (A7) here may be present as part of the aqueous solution or dispersion which is used in preparing the coating composition (A) and which comprises the components (A1) and optionally (A2).

Alternatively the at least one additive (A7) may also be incorporated into the coating composition (A), in the form of a further aqueous dispersion or solution different from the one used, as for example within an aqueous dispersion or solution which comprises at least one pigment (A6) and optionally, moreover, at least one binder and optionally, moreover, (A4).

In one preferred embodiment, the coating composition (A) used in accordance with the invention is a cathodically depositable mini emulsion which comprises at least one cationic emulsifier (A8). The term "mini emulsion" is familiar to the skilled person, from I. M. Grabs et al., Macromol. Symp. 2009, 275-276, pages 133-141, for example. A mini emulsion, accordingly, is an emulsion whose particles have an average size in the range from 5 to 500 nm. Methods for determining the average size of such particles are familiar to the skilled person. Such determination of average particle size takes place preferably by dynamic light scattering in accordance with DIN ISO 13321 (date: Oct. 1, 2004). Mini emulsions of these kinds are known from WO 82/00148 A1, for example. The at least one cationic emulsifier is preferably an emulsifier which has an HLB of ≥8, this being determined preferably by the method of Griffin, which is known to the skilled person. The emulsifier may have reactive functional groups. Such reactive functional groups contemplated are the same reactive functional groups which the binder (A1) may have as well. The emulsifier preferably has a hydrophilic head group, which preferably has a quaternary nitrogen atom bonded to which are four organic, preferably aliphatic radicals, such as organic radicals having 1-10 carbon atoms, for example, and a lipophilic tail group. At least one of these organic radicals preferably has a hydroxyl group.

Optional Further Metal Ions in (A)

The molar fraction of zirconium ions optionally present in the aqueous coating composition (A) is preferably lower by a factor of at least 100, preferably at least 200, more preferably at least 300 or 400 or 500 or 600 or 700 or 800 or 900 or 1000, than the total amount in moles of bismuth present in the aqueous coating composition (A), preferably based in each case on the total weight of the aqueous composition (A). With more particular preference the coating composition (A) contains no zirconium ions.

Zirconium compounds employed typically in coating compositions for improving the corrosion prevention are often used in the form of salts or acids which contain zirconium ions, more particularly $[ZrF_6]^{2-}$ ions. When bismuth ions are present at the same time, however, the use of such $[ZrF_6]^{2-}$ ions results in precipitation of bismuth fluoride. The use of zirconium compounds in the coating composition (A) is therefore to be avoided.

Preferably, moreover, the molar fraction of ions optionally present in the aqueous coating composition (A) and selected from the group consisting of ions of rare earth metals is lower by a factor of at least 100, very preferably by a factor of at least 200 or 300 or 400 or 500 or 600 or 700 or 800 or 900 or 1000, than the total amount in moles of bismuth present in the aqueous coating composition (A), preferably based in each case on the total weight of the aqueous composition (A). More particularly the coating composition (A) contains no ions of rare earth metals. The presence of such ions makes the method of the invention more expensive and makes wastewater treatment more difficult. Such ions of rare earth metals are preferably selected form the group consisting of ions of Sc, Y, La, Ce, Pr, Nd, Pm, Sm, Eu, Gb, Td, Dy, Ho, Er, Tm, Yb, and Lu.

Amine-Blocked Compound

The coating composition (A) of the invention comprises at least one phosphorus-containing compound (P) blocked with at least one amine of the general formula (I),

in which
R$^1$ and R$^2$ each independently of one another are a C$_{1-18}$ aliphatic radical, are a C$_{3-12}$ cycloaliphatic radical, are a C$_{3-12}$ cycloaliphatic radical bridged via a C$_{1-10}$ aliphatic group, or are an aryl or heteroaryl radical bridged via a C$_{1-10}$ aliphatic group, preferably each independently of one another are a C$_{1-18}$ aliphatic radical or are an aryl or heteroaryl radical bridged via a C$_{1-10}$ aliphatic group, and R$^3$ is H, a C$_{1-18}$ aliphatic radical, a C$_{3-12}$ cycloaliphatic radical, a C$_{3-12}$ cycloaliphatic radical bridged via a C$_{1-10}$ aliphatic group, or an aryl or heteroaryl radical bridged via a C$_{1-10}$ aliphatic group, preferably are H, a C$_{1-18}$ aliphatic radical, or are an aryl or heteroaryl radical bridged via a C$_{1-10}$ aliphatic group.

The compound (P) is per se phosphorus-containing, i.e., contains at least one phosphorus atom. Overall, therefore, the compound (P) blocked with at least one amine of the general formula (I) is phosphorus- and nitrogen-containing. is also possible to use mixtures of two or more different compounds (P), each independently of one another blocked with the same or with a different amine of the general formula (I).

Phosphorus-containing compounds (P) which may be used for preparing the coating composition of the invention and may be subjected to amine blocking, and also methods for preparing them, are known to the skilled person, from DE 10 2005 045 228 A1, for example. Corresponding amine-blocked, phosphorus-containing compounds (P) and also their preparation are known to the skilled person, for example, from WO 2011/029502 A1 and WO 2010/063332 A1.

The phosphorus-containing compound (P) is preferably selected from the group consisting of phosphonic diesters, diphosphonic diesters, phosphoric monoesters, and phosphoric diesters, their anions and also mixtures thereof. The respective organic radicals of these compounds may each be acyclic or cyclic or may feature a combination of acyclic and cyclic organic groups.

Particularly preferred for use as phosphorus-containing compound (P) is a compound of the general formula (II) below or an anion thereof,

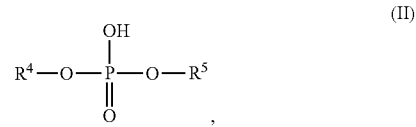

in which
R$^4$ and R$^5$ each independently of one another are selected from the group consisting of
at least singly substituted and unsubstituted, preferably unsubstituted, (hetero)alkyl radicals having 1 to 20, preferably 2 to 16, and more particularly 2 to 10 carbon atoms and optionally 1 to 4 heteroatoms selected from the group consisting of N, NH, N(C$_{1-6}$ alkyl), O, and S,
at least singly substituted and unsubstituted, preferably unsubstituted, (hetero)cycloalkyl radicals having 3 to 20, preferably 3 to 16, and more particularly 3 to 10 carbon atoms and optionally 1 to 4 heteroatoms selected from the group consisting of N, NH, N(C$_{1-6}$ alkyl) , O, and S, and at least singly substituted and unsubstituted, preferably unsubstituted, (hetero)aryl radicals having 5 to 20, preferably 6 to 14, and more particularly 6 to 10 carbon atoms, and optionally 1 to 4 heteroatoms selected from the group consisting of N, NH, N(C$_{1-6}$ alkyl) , O, and S,
at least singly substituted and unsubstituted (hetero)alkyl (hetero)aryl, (hetero)aryl(hetero)alkyl, (hetero)alkyl (hetero)cycloalkyl, (hetero)cycloalkyl(hetero)alkyl, (hetero)aryl(hetero)cycloalkyl, (hetero)cycloalkyl(hetero)aryl, (hetero)alkyl(hetero)cycloalkyl(hetero)aryl, (hetero)alkyl(hetero)aryl(hetero)cycloalkyl, (hetero) aryl(hetero)cycloalkyl(hetero)alkyl, (hetero)aryl(hetero)alkyl(hetero)cycloalkyl, (hetero)cycloalkyl(hetero) alkyl(hetero)aryl, and (hetero)cycloalkyl(hetero)aryl (hetero)alkyl radicals, with the (hetero)alkyl, (hetero) cycloalkyl, and (hetero)aryl groups present therein each containing the number of carbon atoms and optionally heteroatoms as set out in the paragraph above,
and one of the radicals R$^4$ and R$^5$ or both radicals R$^4$ and R$^5$ may additionally also be hydrogen (partial esterification).

Especially preferred for use as phosphorus-containing compound compound of the general formula (II)
in which
R$^4$ and R$^5$ each independently of one another are selected from the group consisting of
least singly substituted and unsubstituted, preferably unsubstituted, (hetero)alkyl radicals having 1 to 20, preferably 2 to 16, and more particularly 2 to 10 carbon atoms and optionally 1to 4 heteroatoms selected from the group consisting of N, NH, N(C$_{1-6}$ alkyl), O, and S,
at least singly substituted and unsubstituted, preferably unsubstituted, (hetero)cycloalkyl radicals having 3 to 20, preferably 3 to 16, and more particularly 3 to 10 carbon atoms and optionally 1 to 4 heteroatoms selected from the group consisting of N, NH, N(C$_{1-6}$ alkyl) , O, and S, and at least singly substituted and unsubstituted, preferably unsubstituted, (hetero)aryl radicals having 5 to 20, preferably 6 to 14, and more particularly 6 to 10 carbon atoms, and optionally 1 to 4 heteroatoms selected from the group consisting of N, NH, N($C_{1-6}$ alkyl), O, and S, and one of the radicals $R^4$ and $R^5$ or both radicals $R^4$ and $R^5$ may additionally also be hydrogen (partial esterification).

(Hetero)alkyl radicals include alkyl radicals and heteroalkyl radicals, preferably alkyl radicals; (hetero)cycloalkyl radicals include cycloalkyl radicals and heterocycloalkyl radicals, preferably cycloalkyl radicals; and (hetero)aryl radicals include aryl radicals and heteroaryl radicals, preferably aryl radicals.

Used in particular as phosphorus-containing compound (P) is at least one monoalkyl phosphate and/or at least one dialkyl phosphate, the alkyl radical or radicals in this case each independently of one another having preferably 1 to 18 carbon atoms. The use of phenyl phosphate is preferred as well.

The phosphorus-containing compound (P) is blocked with at least one amine of the general formula (1) in which $R^1$ and $R^2$ each independently of one another are a $C_{1-18}$ aliphatic radical, are a $C_{3-12}$ cycloaliphatic radical, are a $C_{3-12}$ cycloaliphatic radical bridged via a $C_{1-10}$ aliphatic group, or are an aryl or heteroaryl radical bridged via a $C_{1-10}$ aliphatic group, preferably in each case independently of one another are a $C_{1-18}$ aliphatic radical or are an aryl or heteroaryl radical bridged via a $C_{1-10}$ aliphatic group, and $R^3$ is H, a $C_{1-18}$ aliphatic radical, a cycloaliphatic radical, a $C_{3-12}$ cycloaliphatic radical bridged via a $C_{1-10}$ aliphatic group, or is an aryl or heteroaryl radical bridged via a $C_{1-10}$ aliphatic group, and preferably is H, a $C_{1-18}$ aliphatic radical, or is an aryl or heteroaryl radical bridged via a $C_{1-10}$ aliphatic group.

The expression "$C_{1-18}$ aliphatic radical" in the sense of this invention encompasses preferably acyclic saturated or unsaturated, preferably saturated, aliphatic hydrocarbon radicals, i.e., $C_{1-6}$ aliphatic radicals, each of which are branched or unbranched, preferably branched, and also unsubstituted or optionally at least singly substituted, as for example doubly or triply substituted, but are preferably unsubstituted, having 1 to 18, i.e., 1, 2, 3, 4, 5, 6, 7, 8, 9, 10, 11, 12, 13, 14, 15, 16, 17, or 18 carbon atoms, i.e., $C_{1-18}$ alkenyls, $C_{2-18}$ alkenyls, and $C_{2-18}$ alkynyls. Here, alkenyls have at least one C—C double bond, and alkynyls have at least one C—C triple bond. With particular preference a $C_{1-18}$ aliphatic radical is a $C_{1-18}$ alkanyl, i.e., a $C_{1-18}$ alkyl. Very preferably a $C_{1-18}$ aliphatic radical is a $C_{2-18}$ aliphatic radical and more particularly a $C_{3-18}$ radical or a $C_{4-18}$ aliphatic radical or a $C_{5-18}$ aliphatic radical, or a $C_{6-18}$ aliphatic radical. The $C_{1-18}$ aliphatic radical is preferably selected from the group encompassing methyl, ethyl, n-propyl, 2-propyl, n-butyl, isobutyl, sec-butyl, tent-butyl, n-pentyl, isopentyl, neopentyl and n-hexyl, 2-ethylhexyl, n-heptyl, n-octyl, n-nonyl, isononyl, n-decyl, isodecyl, n-undecyl, n-dodecy, and also isododecyl.

The expression "$C_{3-12}$ cycloaliphatic radical" for the purposes of this invention encompasses preferably cyclic saturated or unsaturated, preferably saturated, cycloaliphatic hydrocarbon radicals, i.e., $C_{3-12}$ cycloaliphatic radicals, which are unsubstituted or optionally at least singly substituted, as for example doubly or triply substituted, but are preferably unsubstituted, having 3 to 12, i.e., 3, 4, 5, 6, 7, 8, 9, 10, 11, or 12 carbon atoms, i.e., $C_{3-12}$ cycloalkanyls and $C_{3-12}$ cycloalkenyls. Here, cycloalkenyls have at least one C—C double bond. A $C_{3-12}$ cycloaliphatic radical is more preferably a $C_{3-12}$ cycloalkanyl, i.e., a $C_{3-12}$ cycloalkyl. Very preferably a $C_{3-12}$ cycloaliphatic radical is a $C_{3-12}$ cycloaliphatic radical and more particularly a $C_{5-6}$ cycloaliphatic radical. A $C_{3-12}$ cycloaliphatic radical is preferably selected from the group encompassing cyclopropyl, cyclobutyl, cyclopentyl, and cyclohexyl.

Preferred aryl radicals are $C_{6-15}$ aromatic radicals, more particularly phenyl radicals optionally substituted by at least one $C_{1-6}$ aliphatic radical. Preferred heteroaryl radicals are $C_{4-15}$ heteroaromatic radicals, which have at least one heteroatom such as N, S and/or O and/or at least one heteroatom group such as N($C_{1-6}$ alkyl) and/or NH, more particularly, pryidyl radicals optionally substituted by at least one $C_{1-6}$ aliphatic radical.

The expression "aryl or heteroaryl bridged via a $C_{1-10}$ aliphatic group" for the purposes of the present invention means preferably that the aryl or heteroaryl radical or the $C_{3-12}$ cycloaliphatic radical is attached to the respective superordinate general structure by way of a $C_{1-10}$ aliphatic group. The $C_{1-10}$ aliphatic group is preferably a $C_{1-10}$ alkylene group. This $C_{1-10}$ aliphatic group may be branched or unbranched and saturated or unsaturated. The $C_{1-10}$ aliphatic group is preferably selected from the group encompassing —$CH_2$—, —$CH_2$—$CH_2$—, —$CH(CH_3)$—, —$CH_2$—$CH_2$—$CH_2$—, —$CH(CH_3)$—$CH_2$—, —$CH(CH_2CH_3)$—, —$CH_2$—$(CH_2)_2$—$CH_2$—, —$CH(CH_3)$—$CH_2$—$CH_2$—, —$CH_2$—$CH(CH_3)$—$CH_2$—, —$CH(CH_3)$—$CH(CH_3)$—, —$CH(CH_2CH_3)$—$CH_2$—, —$C(CH_3)_2$—$CH_2$—, —$CH(CH_2CH_2CH_3)$—, —$C(CH_3)(CH_2CH_3)$—, —$CH_2$—$(CH_2)_3$—$CH_2$—, —$CH(CH_3)$—$CH_2$—$CH_2$—$CH_2$—, —$CH_2$—$CH(CH_3)$—$CH_2$—$CH_2$—, —$CH(CH_3)$—$CH_2$—$CH(CH_3)$—, —$CH(CH_3)$—$CH(CH_3)$—$CH_2$—, —$C(CH_3)_2$—$CH_2$—$CH_2$—, —$CH_2$—$C(CH_3)_2$—$CH_2$—, —$CH(CH_2CH_3)$—$CH_2$—$CH_2$—, —$CH_2$—$CH(CH_2CH_3)$—$CH_2$—, —$C(CH_3)_2$—$CH(CH_3)$—, —$CH(CH_3)$—$CH(CH_3)$—, —$C(CH_3)(CH_2CH_3)$—$CH_2$—, —$CH(CH_2CH_2CH_3)$—$CH_2$—, —$C(CH_2CH_3)$—$CH_2$—, —$CH(CH_2CH_2CH_2CH_3)$—, —$C(CH_3)(CH_2CH_2CH_3)$—, —$C(CH_2CH_3)_2$—, and —$CH_2$—$(CH_2)_4$—$CH_2$—.

Preferably at least one, more preferably at least two, and more particularly all three of the radicals $R^1$, $R^2$, and $R^3$ each independently of one another is or are a $C_{1-18}$ aliphatic or a $C_{3-18}$ aliphatic radical or a $C_{4-18}$ aliphatic radical or a $C_{5-18}$ aliphatic radical or a $C_{6-18}$ aliphatic radical. More preferably at least one, more preferably at least two, and more particularly all three of the radicals $R^1$, $R^2$, and $R^3$ in each case independently of one another is or are a $C_{1-18}$ alkyl radical or a $C_{3-18}$ alkyl radical or a $C_{4-18}$ alkyl radical or a $C_{5-18}$ alkyl radical or a $C_{6-18}$ alkyl radical. Very preferably at least one, more preferably at least two, and more particularly all three of the radicals $R^1$, $R^2$, and $R^3$ in each case independently of one another is or are a $C_{6-18}$ alkyl radical. With particular preference the aforementioned aliphatic radicals and alkyl radicals are each branched or unbranched radicals, more particularly branched radicals, of these kinds.

$R^3$ is preferably a $C_{1-18}$ aliphatic radical or is an aryl or heteroaryl radical bridged via a $C_{1-10}$ aliphatic group; in other words, the amine of the general formula (I) is a tertiary amine.

Examples of suitable amines of the general formula (I) with which the phosphorus-containing compound (P) may be blocked are unbranched aliphatic amines in which $R^1$ and $R^2$ are each an unbranched $C_{1-18}$ aliphatic radical, such as trioctylamine, dioctylamine, octyldimethylamine, dinonylamine, trinonylamine, nonyldimethylamine, tridodecylamine, and dodecyldimethylamine. Examples of suitable amines of the general formula (I) with which the phosphorus-containing compound (P) may be blocked are branched aliphatic amines in which $R^1$ and $R^2$, or one of the radicals $R^1$ and $R^2$, is or are in each case a branched $C_{1-18}$ aliphatic radical, such as di(isopropanol)amine, diisoamylamine, diisobutylamine, diisononylamine, dodecyldimethylamine, isododecyldimethylamine, tris(2-ethylhexyl)amine, triisoamylamine, triisononylamine, triisooctylamine, and triisopropylamine. Especially preferred is tris(2-ethylhexyl)amine.

Phosphorus-containing compounds (P) used in accordance with the invention and blocked with at least one amine of the general formula (I) are available commercially, for example as Nacure® products from King industries.

The coating composition (A) of the invention preferably comprises the at least one phosphorus-containing compound (P) blocked with at least one amine of the general formula (I) in an amount in a range from 0.05 to 5 wt % or in a range from 0.1 to 5 wt %, more preferably in a range from 0.1 to 4 wt % or in a range from 0.1 to 3 wt %, very preferably in a range from 0.2 to 2.5 wt %, more particularly in a range from 0.2 to 2 wt %, or in a range from 0.3 to 2 wt %, or in a range from 0.5 to 1.5 wt %, based in each case on the total weight of the coating composition (A).

The relative weight ratio of the at least one phosphorus-containing compound (P) blocked with at least one amine of the general formula (I) to the total amount of bismuth in the coating composition (A) is preferably in a range from 1:6 to 1:1, more preferably in a range from 1:5 to 1:1.5, very preferably in a range from 1:4 to 1:2.

The coating composition (A) of the invention may optionally comprise as additive (A7) at least one crystallization inhibitor which prevents precipitation of the compound (P) blocked with at least one amine of the general formula (I).

It is possible in accordance with the invention not only to block the phosphorus-containing compound (P) with only one amine of the general formula (I), but also to carry out blocking using a mixture of at least two different amines of the general formula (I) or with a mixture of at least one amine of the general formula (I) and at least one further, different amine, which need not necessarily be encompassed by the general formula (I). Thus, for example, mixtures of secondary or tertiary amines of the general formula (I), having in each case unbranched $C_{1-18}$ aliphatic radicals $R^1$, $R^2$ and/or $R^3$, and of secondary or tertiary amines of the general formula (I) having at least one branched $C_{1-18}$ aliphatic radical $R^1$, $R^2$ and/or $R^3$ may be used. The use of suitable mixtures may likewise prevent possible crystallization. In that case, in particular, the amine of the general formula (I) which has at least one branched $C_{1-18}$ aliphatic radical acts preferably as a crystallization inhibitor. Examples of suitable further amines not encompassed by the general formula (I), but which may additionally be present in the coating composition (A) of the invention, are bicyclic amines, for example, more particularly unsaturated bicyclic amines such as 1,5-diazabicyclo[4.3.0]non-5-ene and/or 1,8-diazabicyclo[5.4.0]undec-7-ene.

Method for Producing the Coating Composition (A)

A further subject of the present invention is a method for producing the aqueous coating composition (A) of the invention, which method comprises at least the step (0):

(0) at least partly, preferably completely, converting at least one water-insoluble bismuth compound, more preferably at least one compound selected from the group consisting of oxides, basic oxides, hydroxides, carbonates, nitrates, basic nitrates, salicylates, and basic salicylates of bismuth, and also mixtures thereof, by at least partial, preferably complete, reaction of this compound with at least one at least bidentate complexing agent (A5) suitable for complexing bismuth, into at least one water-soluble bismuth compound (A3), optionally in the presence of at least one of components (A6) to (A8) and optionally (A1) and/or (A2) and/or (B), in water, to give a mixture comprising at least components (A3) and (A5), optionally (A4) and also, optionally, (A1) and/or (A2), and/or (P) blocked with at least one amine of the general formula (I), and/or at least one of the components (A6) to (A8), of the coating composition (A).

The water-insoluble bismuth compound is preferably part of a pigment paste which comprises at least one pigment (A6).

After step (0) has been carried out, the method of the invention optionally comprises at least one further step, as follows:

mixing the mixture obtained after step (0) has been carried out, least with component (A1) and optionally with component (A2) and also (P) blocked with at least one amine of the general formula (I), and, optionally, with at least one of components (A6) to (A8), to give the coating composition (A).

The duration of step (0) is preferably at least 2 or at least 4 or at least 6 or at least 8 or at least 10 or at least 12 or at least 14 or at least 16 or at least 18 or at least 20 or at least 22 or at least 24 hours. Step (0) is carried out preferably with stirring at a temperature in the range from 18 to 23° C.

All preferred embodiments described hereinabove in connection with the aqueous coating composition (A) of the invention are also preferred embodiments of the aqueous coating composition (A) used in accordance with the invention, in relation to its production.

Use of the Coating Composition (A)

A further subject of the present invention is a use of the coating composition (A) of the invention, or of the aqueous coating composition (A) used in the method of the invention for at least partly coating an electrically conductive substrate with an electrocoat material, for at least partly coating an electrically conductive substrate with an electrocoat material.

All preferred embodiments described hereinabove in connection with the aqueous coating composition (A) of the invention are also preferred embodiments of the aqueous coating composition (A) used in accordance with the invention, in relation to its use for at least partly coating an electrically conductive substrate with an electrocoat material.

Method for at Least Partly Coating an Electrically Conductive Substrate with the Coating Composition (A)

A further subject of the present invention is a method for at least partly coating an electrically conductive substrate with an electrocoat material, comprising least one step (1):

(1) contacting the electrically conductive substrate, connected as cathode, with the aqueous coating composition (A) of the invention, particularly if the substrate used is aluminum or a substrate having at least one aluminum surface.

In a preferred embodiment, the method of the invention is a method for at least partly coating an electrically conductive substrate with an electrocoat material, comprising at least one step (1):

(1) contacting the electrically conductive substrate, connected as cathode, with the aqueous coating composition (A) of the invention, step (1) being carried out in at least two successive stages (1a) and (1b):

(1a) at an applied voltage in a range from 1 to 50 V, which is preferably applied over a duration of at least 5 seconds, and (1b) at an applied voltage in a range from 50 to 400 V, with the proviso that the voltage applied in stage (1b) is greater by at least 10 V than the voltage applied in stage (1a).

All preferred embodiments described hereinabove in connection with the aqueous coating composition (A) of the invention are also preferred embodiments of the aqueous coating composition (A) used in accordance with the invention, in relation to its use in step (1) of the method of the invention for at least partly coating an electrically conductive substrate with an electrocoat material.

Step (1)

The method of the invention for at least partly coating an electrically conductive substrate with an electrocoat material comprises at least one step (1), this being a contacting of the electrically conductive substrate connected as cathode with the aqueous coating composition (A).

"Contacting" in the sense of the present invention refers preferably to the immersing of the substrate, intended for at least partial coating with the coating composition (A), into the aqueous coating composition (A) used, the spraying of the substrate intended for at least partial coating with the coating composition (A), or the roll of application to the substrate intended for at least partial coating with the coating composition (A). More particularly, the term "contacting" in the sense of the present invention refers to immersing of the substrate intended for at least partial coating with the coating composition (A) into the aqueous coating composition (A) used.

The method of the invention is preferably a method for at least partly coating an electrically conductive substrate used in and/or for automobile construction. The method may take place continuously in the form of a strip coating operation, such as in the coil coating process, for example, or discontinuously.

With step (1) of the method of the invention, the substrate is at least partly coated with the aqueous coating composition (A) of the invention by cataphoretic deposition of this coating composition on the substrate surface.

Step (1) is accomplished by applying an electrical voltage between the substrate and at least one counterelectrode. Step (1) of the method of the invention is carried out preferably in a dip-coating bath. The counterelectrode may in this case be located in the dip-coating bath. Alternatively or additionally, the counterelectrode may also be present separately from the dip-coating bath, for example via an anionic exchange membrane which is permeable for anions. In this case, anions formed during dip coating are transported from the coating material through the membrane into the anolyte, allowing the pH in the dip-coating bath to be regulated or kept constant. The counterelectrode is preferably separate from the dip-coating bath.

In step (1) of the method of the invention, preferably, there is full coating of the substrate with the aqueous coating composition (A) of the invention, by complete cataphoretic deposition on the entire substrate surface.

Preferably, in step (1) of the method of the invention, a substrate intended for at least partial coating is introduced at least partly, preferably completely, into a dip-coating bath, and step (1) is carried out within this dip-coating bath.

The aim in step (1) of the method of the inventions is at least partial coating of the substrate by an at least partial cataphoretic deposition of the aqueous coating composition (A). The aqueous coating composition (A) of the invention in this case is deposited as electrocoat material on the substrate surface.

The aqueous coating composition (A) of the invention is preferably contacted with an electrically conducting anode and with the electrically conductive substrate connected as cathode. Alternatively, the aqueous coating composition (A) does not have to be brought directly into contact with an electrically conducting anode, if the anode, for example, is present separately from the dip-coating bath, as for example via an anion exchange membrane which is permeable for anions.

The passage of electrical current between anode and cathode is accompanied by deposition of a firmly adhering paint film on the cathode, i.e., on the substrate.

Step (1) of the method of the invention is carried out preferably at a dip bath temperature in a range from 20 to 45° C., more preferably in a range from 22 to 42° C., very preferably in a range from 24 to 41° C., especially preferably in a range from 26 to 40° C., with more particular preference in a range from 27 to 39° C., such as in a range from 28 to 38° C., for example. In another preferred embodiment of the method of the invention, step (1) is carried out at a dip bath temperature of not more than 40° C., more preferably not more than 38° C., very preferably not more than 35° C., especially preferably not more than 34° C. or not more than 33° C. or not more than 32° C. or not more than 31° C. or not more than 30° C. or not more than 29° C. or not more than 28° C. In a further, different preferred embodiment of the method of the invention, step (1) is carried out at a dip bath temperature ≤32° C. such as, for example, ≤31° C. or ≤30° C. or ≤29° C. or ≤28° C. or ≤27° C. or ≤26° C. or >25° C. or ≤24° C. or ≤23° C.

In step (1) of the method of the invention, the aqueous coating composition (A) of the invention is preferably applied such that the resulting electrocoat film has a dry film thickness in the range from 5 to 40 μm, more preferably from 10 to 30 μm, especially preferably from 20 to 25 μm.

Stages (1a) and (1b) Within Step (1)

Step (1) of the method of the invention is carried out in at least two successive stages (1a) and (1b) as follows:

(1a) at an applied voltage in a range from 1 to 50 V, which is applied over a duration of least 5 seconds, and (1b) at an applied voltage in a range from 50 to 400 V, with the proviso that the voltage applied in stage (1b) is greater by at least 10 V than the voltage applied in stage (1a).

Stages (1a) and (1b) within step (1) of the method the invention are carried out preferably within a dip-coating bath that is used, comprising the coating composition (A).

Stage (1a)

During the implementation of stage (1a), a corresponding bismuth-enriched layer is formed as a preliminary deposition layer on the electrically conductive substrate, this being detectable and quantifiable by X-ray fluorescence analysis, for example. The bismuth here is preferably in the form of metallic bismuth(0), but alternatively or additionally may also be present in trivalent form and/or in other oxidation states. This preliminary deposition layer is, in particular, largely free of components (A1) and optionally (A2) and/or (A5) and/or (A6) present in the coating composition. The bismuth-enriched layer formed accordingly preferably exerts a corrosion-preventing effect, the pronouncedness of this effect rising in line with the bismuth layer add-on (in mg of bismuth per m$^2$ of surface area). Preferred layer add-ons are at least 10 or at least 20 or at least 30, more preferably at least 40 or at least 50, and more particularly at least 100 or at least 180, mg of bismuth (calculated as metal) per m² of surface area.

Stage (1a) is carried out preferably with an applied voltage in a range from 1 to 45 V or in a range from 1 to 40 V or in a range from 1 to 35 V or in a range from 1 to 30 V or in a range from 1 to 25 V or in a range from 1 to 20 V or in a range from 1 to 15 V or in a range from 1 to 10 V or in a range from 1 to 5 V. In another preferred embodiment, stage (1a) is carried out with an applied voltage in a range from 2 to 45 V or in a range from 2 to 40 V or in a range from 2 to 35 V or in a range from 2 to 30 V or in a range from 3 to 25 V or in a range from 3 to 20 V or in a range from 3 to 15 V or in a range from 3 to 10 V or in a range from 3 to 6 V.

The voltage applied in stage (1a) is applied over a duration of at least 5 seconds, preferably of at least 10 or at least 15 or at least 20 or at least 25 or at least 30 or at least 40 or at least 50 seconds, more preferably of at least 60 or at least 70 or at least 80 or at least 90 or at least 100 seconds, very preferably of at least 110 or at least 120 seconds. The duration here is preferably not more than 300 seconds, more preferably not more than 250 seconds, and more particularly not more than 150 seconds. This duration designates in each case the interval of time during which the voltage in question is maintained during the implementation of stage (1a).

In one preferred embodiment, the voltage applied in stage (1a) is applied over a duration in a range from at least 5 to 500 seconds or from 5 to 500 seconds or from 10 to 500 seconds or from 10 to 300 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

A voltage in a range from 1 to 50 V which is applied during the implementation of stage (1a) over a duration of at least 10 seconds may be set gaivanostatically (constantly regulated current). Alternatively, this setting may also be accomplished potentiostatically (constantly regulated voltage), however, with stage (1a) being carried out at a deposition current or in a deposition current range that corresponds to a corresponding voltage in a range from 1 to 50 V. A deposition current of this kind is preferably in a range from 20 to 400 mA, more preferably in a range from 30 to 300 mA or in a range from 40 to 250 mA or in a range from 50 to 220 mA, more particularly in a range from 55 to 200 mA. Such deposition currents within stage (1a) are used preferably when employing substrates which have a surface area in the range from 300 to 500 cm², more particularly from 350 to 450 cm² or 395 to 405 cm².

The deposition current density in stage (1a) is preferably at least 1 A/m², more preferably at least 2 A/m², and more particularly at least 3 A/m², but preferably in each case not more than 20 A/m², more preferably in each case not more than 10 A/m².

The deposition current density or the deposition current in stage (1a) here is applied preferably over a duration of at least 5 or at least 10 seconds, preferably at least 15 or at least 20 or at least 25 or at least 30 or at least 40 or at least 50 seconds, more preferably at least 60 or at least 70 or at least 80 or at least 90 or at least 100 seconds, very preferably least 110 or at least 120 seconds. The duration here is preferably not more than 300 seconds, more preferably not more than 250 seconds, and more particularly not more than 150 seconds. In another preferred embodiment, the deposition current density or deposition current applied in stage (1a) is applied over a duration in a range from at least 10 to 500 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

The voltage or the deposition current or the deposition current density may be kept constant here during the stated duration. Alternatively, however, the voltage or the deposition current or the deposition current density may adopt different values during the deposition duration within stage (1a), within the stated minimum and maximum values in the range from 1 to 50 V—for example, it may swing back and forth or rise in ramp or step form from the minimum to the maximum deposition voltage.

The setting of the voltage or of the deposition current or deposition current density during the implementation of stage (1a) may take place "suddenly", in other words, for example, by appropriately switching over to a rectifier, this requiring a certain technically related minimum period of time in order to attain the target voltage. Alternatively, setting may take place in the form a ramp, in other words at least approximately continuously and preferably linearly over a selectable period, as for example a period of up to 10, 20, 30, 40, 50, 60, 120, or 300 seconds. Preferred is a ramp of up to 120 seconds, more preferably of up to 60 seconds. A steplike voltage increase is also possible here, in which case preferably a certain hold time at the voltage is observed for each of these voltage stages, of 1, 5, 10, or 20 seconds, for example. Also possible is a combination of ramps and steps.

The setting of the voltage or of the deposition current or deposition current density in stage (1a) may also be regulated in the form of pulses, with times without current or with a voltage below the minimum level between two pulses. The pulse duration may be situated, for example, in the range from 0.1 to 10 seconds. The "period" for the deposition is then considered, preferably, to be the sum total of the durations for which the deposition voltage lies within the aforementioned maximum and minimum values when implementing step (1a). Ramps and pulses may also be combined with one another.

During the implementation of stage (1a), the complexing agent (A5) is preferably liberated again at least partly, more particularly completely, since the component (A3) complexed by (A5) is deposited. in view of the presence of component (A4) in the coating composition (A), the liberated complexing agent (A5) may be utilized in order to convert component (A4) at least partly into a form in solution in (A)—that is (A5) may be used for the continual generation of (A3), in order to ensure the presence of an appropriate reservoir of (A3).

Stage (1b)

During the implementation of stage (1b), the actual dip varnish coating is formed on the preliminary deposition layer obtained after step (1a), by deposition of the dip varnish components, more particularly (A1) and optionally (A2) and/or (A5). This coating as well comprises bismuth, which may be present in trivalent form or alternatively or additionally in other oxidation states. This bismuth may act as catalyst in a downstream optional curing step or cross-linking step (6) of the method of the invention. In the production of the coating composition (A), accordingly, it is possible with preference to forgo the incorporation of such a catalyst.

Stage (1b) is preferably carried out at an applied voltage in a range from 55 to 400 V or in a range from 75 to 400 V or in a range from 95 to 400 V or in a range from 115 to 390

V or in a range from 135 to 370 V or in a range from 155 to 350 V or in a range from 175 to 330 V or in a range from 195 to 310 V or in a range from 215 to 290 V.

In stage (1b), preferably, in a time interval in the range from 0 to 300 seconds after the end of the implementation of stage (1a), a voltage in the range from 50 to 400 V is applied, preferably relative to an inert counterelectrode, but with the proviso that this voltage applied in stage (1b) is greater by at least 10 V than the voltage applied before in stage (1a). Within the implementation of stage (1b), this voltage is preferably maintained for a time in the range from 10 to 300 seconds, preferably in the range from 30 to 240 seconds, at not less than a value within the stated voltage range from 50 to 400 V, subject to the proviso stated above.

The voltage applied in stage (1b) is preferably applied over a duration of at least 10 seconds or at least 15 or at least 20 or at least 25 or at least 30 or least 40 or at least 50 seconds, more preferably of at least 60 or at least 70 or at least 80 or at least 90 or at least 100 seconds, very preferably of at least 110 or at least 120 seconds. The duration here is preferably not more than 300 seconds, more preferably not more than 250 seconds, and more particularly not more than 150 seconds. This duration designates in each case the interval of time during which the voltage in question is maintained during the implementation of stage (1b).

In one preferred embodiment, the voltage applied in stage (1b) is applied over a duration in a range from at least 10 to 500 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

The voltage increase from stage (1a) to stage (1b) may take place "suddenly", in other words, for example, by corresponding switching to a rectifier, this requiring a certain technically related minimum time to attain the target voltage. The voltage increase may alternatively take place in the form of a ramp, in other words at least approximately continuously over a selectable period, as for example of up to 10, 20, 30, 40, 50, 60, 120, or 300 seconds. A preferred ramp is of up to 120 seconds, more preferably of up to 60 seconds. Also possible is a voltage increase in steps, in which case a certain holding time at the voltage is preferably observed for each of these voltage steps, of 1, 5, 10, or 20 seconds, for example. Also possible is a combination of ramps and steps.

The indication of a period such as, for example, of a period in the range from 10 to 300 seconds for the application of the voltage in stage (1b) in a range from 50 to 400 V may mean that this voltage is held constant during the stated period. Alternatively, however, the voltage may also adopt different values during the deposition time within stage (1b), within the stated minimum and maximum values in the range from 50 to 400 V—for example, it may swing back and forth or increase in a ramp or in steps from the minimum to the maximum deposition voltage.

The voltage, i.e., deposition voltage, in stage (1b) may also be regulated in the form of pulses, with times without current and/or with a deposition voltage below the minimum level between two pulses. The pulse duration may be situated, for example, in the range from 0.1 to 10 seconds. The "period" for the deposition is then considered preferably to be the sum of the durations in which the deposition voltage lies within the stated maximum and minimum levels in the implementation of step (1b). Ramps and pulses may also be combined with one another.

Further Optional Method Steps

The method the invention optionally further comprises a step (2), preferably following step (1), which as set out above entails two stages (1a) and (1b), as follows:

(2) contacting the substrate at least partly coated with the coating composition (A) with an aqueous sol-gel composition prior to curing of the deposited coating composition (A).

The skilled person knows the terms "sol-gel composition", "sol-gel", and the preparation of sol-gel compositions and sol-gels, from—for example—D. Wang et al., Progress in Organic Coatings 2009, 64, 327-338 or S. Zheng et al., J. Sol-Gel. Sci. Technol. 2010, 54, 174-187.

An aqueous "sol-gel composition" in the sense of the present invention is preferably an aqueous composition prepared by reacting at least one starting compound with water, with hydrolysis and condensation, this starting compound having at least one metal atom and/or semimetal atom such as $M^1$ and/or $M^2$, for example, and having at least two hydrolyzable groups such as, for example, two hydrolyzable groups $X^1$, and further, optionally, having at least one nonhydrolyzable organic radical such as $R^1$, for example. The at least two hydrolyzable groups here are preferably each bonded directly to the at least one metal atom and/or at least one semimetal atom present in the at least one starting compound, in each case by means of a single bond. Because of the presence of the nonhydrolyzable organic radical such as $R^1$, for example, a sol-gel composition of this kind used in accordance with the invention may also be termed a "sol-gel hybrid composition".

The aqueous sol-gel composition used in accordance with the invention in the optional step (2) is preferably obtainable by reaction of at least one compound $Si(X^1)_3(R^1)$,
where $R^1$ therein is a nonhydrolyzable organic radical which has least one reactive functional group selected from the group consisting of primary amino groups, secondary amino groups, epoxide groups, and groups which have an ethylenically unsaturated double bond,
more particularly at least one compound $Si(X^1)_3(R^1)$ where $R^1$ therein is a nonhydrolyzable organic radical which has at least one epoxide group as a reactive functional group, and in which $X^1$ is a hydrolyzable group such as an $O-C_{1-6}$ alkyl group, for example, and, moreover,
optionally at least one further compound $Si(X^1)_3(R^1)$ where $R^1$ therein is a non-hydrolyzable organic radical which has at least one reactive functional group selected from the group consisting of primary amino groups and secondary amino groups, and in which $X^1$ is a hydrolyzable group such as an $O-C_{1-6}$ alkyl group, for example,
and optionally at least one compound $Si(X^1)_4$ in which $X^1$ is a hydrolyzable group such as an $O-C_{1-6}$ alkyl group, for example,
and optionally at least one compound $Si(X^1)_3(R^1)$,
where $R^1$ therein is a nonhydrolyzable organic radical which has no reactive functional group, such as a $C_{1-10}$ alkyl radical for example, and in which $X^1$ is a hydrolyzable group such as an $O-C_{1-6}$ alkyl group, for example,
and optionally at least one compound $Zr(X^1)_4$ in which $X^1$ is a hydrolyzable group such as an $O-C_{1-6}$ alkyl group, for example,
with water.

The method of the invention preferably further comprises a step (3), which preferably follows step (1) or step (2), as follows:

(3) rinsing the substrate coated at least partly with the aqueous coating composition (A), obtainable after step (1) or step (2), with water and/or with ultrafiltrate.

The term "ultrafiltrate" or "ultrafiltration", particularly in connection with electrodeposition coating, is familiar to the skilled person and is defined, for example, in Römpp Lexikon, Lacke und Druckfarben, Georg Thieme Verlag 1998.

The implementation of step (3) permits the recycling of excess constituents of the inventively employed aqueous coating composition (A), present after step (1) on the at least partly coated substrate, into the dip-coating bath.

The method of the invention may further comprise an optional step (4), which preferably follows step (1) or (2) or (3), namely a step (4) of (4) contacting the substrate at least partly coated with the aqueous coating composition (A), obtainable after step (1) or step (2) or step (3), with water and/or ultrafiltrate, preferably over a duration of 30 seconds up to one hour, more preferably over a duration of 30 seconds up to 30 minutes.

The method of the invention may further comprise an optional step (4a), which preferably follows step (1), more particularly stage (1b), or (2) or (3) or (4), namely a step (4a) of (4a) contacting the substrate at least partly coated with the aqueous coating composition (A), obtainable after step (1) or step (2) or step (3) or step (4), with an aqueous solution or dispersion, preferably an aqueous solution, of at least one crosslinking catalyst (V), preferably of at least one crosslinking catalyst (V) which is suitable for crosslinking the reactive functional groups of the binder (A1), more particularly of an epoxide-based polymeric resin and/or acrylate-based polymeric resin used as binder (A1).

The aqueous solution of the at least one crosslinking catalyst (V) is preferably an aqueous solution of a bismuth compound such as, for example, an aqueous lution comprising a compound containing trivalent bismuth. During the implementation of the optional step (4a), a cathodic voltage relative to an anode is preferably applied to the electrically conductive substrate used, more preferably in a range from 4 V to 100 V. Carrying out step (4a) permits efficient crosslinking in the case where too small an amount of component (A3) remains in the coating composition after implementation of stage (1a) of step (1) to be deposited in stage (1b).

In one preferred embodiment the method of the invention further comprises at least one step (5), which preferably follows step (1) and/or (2) and/or (3) and/or (4) and/or (4a), but is preferably carried out before an optional step (6), as follows:

(5) applying at least one further coating film to the substrate coated at least partly with the inventively employed aqueous coating composition (A) and obtainable after step (1) and/or (2) and/or (3) and/or (4) and/or (4a).

By means of step (5) it is possible for one or more further coating films to be applied to the substrate at least partly coated with the coating composition (A) and obtainable after step (1) and/or (2) and/or (3) and/or (4) and/or (4a). If two or more coats have to be applied, step (5) may be repeated often accordingly. Examples of further coating films for application are, for example, basecoat films, surfacer films and/or single-coat or multi-coat topcoat films. The aqueous coating composition (A) applied by step (1), optionally after having been subjected to a subsequent rinse with an aqueous sol-gel composition as per step (2) and/or to an optional rinse with water and/or ultrafiltrate (as per step (3)), and/or after step (4) and/or (4a) has been carried out, can be cured, this curing taking place as described below as per step (6), before a further coat is applied such as a basecoat film, surfacer film and/or a single-coat or multicoat topcoat film. Alternatively, however, the aqueous coating composition (A) applied by step (1), optionally after having been subjected to a subsequent rinse with an aqueous sol-gel composition as per step (2) and/or to an optional rinse with water and/or ultrafiltrate (as per step (3)), and/or after step (4) and/or (4a) has been carried out, may not be cured, but instead firstly a further coat may be applied such as a basecoat film, surfacer film and/or a single-coat or multicoat topcoat film ("wet-on-wet method") in this case, following application of this or these further coat(s), the overall system thus obtained is cured, it being possible for this curing to take place as described below, preferably in accordance with a step (6).

In one preferred embodiment the method of the invention further comprises at least one step (6), as follows:

(6) curing the aqueous coating composition (A) applied at least partly to the substrate after step (1) and/or optionally (2) and/or (3) and/or (4) and/or (4a), or the coating applied at least partly to the substrate after step (1) and/or optionally (2) and/or (3) and/or (4) and/or (4a) and/or (5).

Step (6) of the method of the invention is carried out preferably by means of baking after step (1) or optionally (2) or optionally only after at least one further step (5). Step (6) takes place preferably in an oven. The curing here takes place preferably at a substrate temperature in the range from 140° C. to 200° C., more preferably in a range from 150° C. to 190° C., very preferably in a range from 160° C. to 180° C. Step (6) takes place preferably over a duration of at least 2 minutes to 2 hours, more preferably over a duration of at least 5 minutes to 1 hour, very preferably over a duration of at least 10 minutes to 30 minutes.

At Least Partly Coated Substrate

A further subject of the present invention is an electrically conductive substrate coated at least partly with the aqueous coating composition (A) of the invention, or an at least partly coated electrically conductive substrate which is obtainable by means of the method of the invention for at least partly coating an electrically conductive substrate with an electrocoat material.

The at least partly coated electrically conductive substrate is preferably a substrate of aluminum or has at least one surface of aluminum.

A further subject of the present invention is a preferably metallic component or preferably metallic article produced from at least one such substrate.

Such articles may be, for example, metal strips. Components of this kind may be, for example, bodies and body parts of vehicles such as automobiles, trucks, motorcycles, buses, and coaches, and components of electrical household products, or else components from the area of apparatus claddings, facade claddings, ceiling claddings, or window profiles.

Methods of Determination

1. Filiform Corrosion to DIN EN 3665

Determining the filiform corrosion is used to ascertain the corrosion resistance of a coating on a substrate. This determination is carried out to DIN EN 3665 (date: Aug. 1, 1997)

for the electrically conductive substrate aluminum (ALU), coated with an inventive coating composition or with a comparative coating composition, over a duration of 1008 hours. In the course of this time, the coating in question, starting from a line of induced damage to the coating, is undermined by corrosion that takes the form of a line or thread. The average and maximum thread length in [mm] may be measured here according to PAPP WT 3102 (Daimler) (date: Dec. 21, 2006) and are a measure of the resistance of the coating to corrosion.

2. X-ray Fluorescence Analysis (XFA) for Film Weight Determination

The film weight (in mg per $m^2$ surface area) of the coating under investigation is determined by means of wavelength-dispersive X-ray fluorescence analysis (XFA) according to DIN 51001 (date: August 2003). In this way, for example, the bismuth content or bismuth layer add-on of a coating can be determined, such as, for example, that of the coating obtained after stage (1a) of step (1) of the method of the invention. By analogy it is also possible to determine the respective amount of other elements such as zirconium, for example. The signals obtained when carrying out the X-ray fluorescence analysis are corrected to account for a separately measured substrate of an uncoated reference sample. Gross count rates (in kilocounts per second) are determined for each of the elements under anlaysis, such as bismuth. The gross count rates of the respective elements of a reference sample (uncoated substrate) are subtracted from the respective gross count rates determined in this way for the sample in question, to give the net count rates for the elements under analysis. These are converted, using an element-specific transfer function (obtained from a calibration measurement), into film weights ($mg/cm^2$). Where a number of coats are applied, the respective film weight is determined after each application. Then, for a subsequent coat, the gross count rate of the preceding film in each case counts as a reference. This method of determination is used to determine the bismuth content of the coating obtained after stage (1a) of step (1) of the method of the invention.

3. Atomic Emission Spectrometry (ICP-OES) for Determining the Total Amount of Bismuth Present in the Coating Composition (A)

The amount of certain elements in a sample under analysis, such as the bismuth content, for example, is determined using inductively coupled plasma atomic emission spectrometry (ICP-OES) according to DIN EN ISO 11885 (date: September, 2009). For this purpose, a sample of coating composition (A) or of a comparative composition is taken and this sample is digested by microwave: here, a sample of the coating composition (A) or of a comparative composition is weighed out, and the volatile constituents of this sample are removed by heating with a linear temperature increase from 18° C. to 130° C. over the course of an hour. An amount of up to 0.5 g of this resulting sample is admixed with a 1:1 mixture of nitric acid (65% strength) and sulfuric acid (96% strength) (5 ml of each of said acids) and then microwave digestion is carried out using an instrument from Berghof (Speedwave IV instrument). During the digestion, the sample mixture is heated to a temperature of 250° C. over 20 to 30 minutes, and this temperature is held for 10 minutes. Following the digestion, the remaining sample mixture should be a clear solution without a solids fraction. Using ICP-OES according to DIN EN ISO 11885, the total amount of bismuth in the sample in then ascertained. This sample is subjected to thermal excitation in an argon plasma generated by a high-frequency field, and the light emitted due to electron transitions becomes visible as a spectral line of the corresponding wavelength, and is analyzed using an optical system. There is a linear relation between the intensity of the light emitted and the concentration of the element in question, such as bismuth. Prior to implementation, using known element standards (reference standards), the calibration measurements are carried out as a function of the particular sample under analysis. These calibrations can be used to determine concentrations of unknown solutions such as the concentration of the amount of bismuth in the sample.

For separate determination of the fraction of bismuth present in solution in the respective composition, i.e., for example, the amount of (A3), the sample used is a sample of the ultrafiltrate. The ultrafiltration in this case is carried out for the duration of one hour (ultrafiltration in a circuit; ultrafiltration membrane: Nadir, PVDF, RM-UV 150T), and a sample is taken from the permeate or ultrafiltrate. The amount of (A3) in this sample is then determined by ICP-OES according to DIN EN ISO 11885. It is assumed here that component (A3) present in dissolved form in (A), is transferred completely into the ultrafiltrate. If the fraction of (A3) determined as outlined above is subtracted from the total amount of bismuth determined beforehand, the result is the fraction of component (A4) present in the sample under analysis.

The examples which follow serve to elucidate the invention, but should not be interpreted as imposing any restriction.

Unless otherwise noted, the figures in percent hereinafter are in each case percentages by weight.

INVENTIVE AND COMPARATIVE EXAMPLES

1. Production of Inventive Aqueous Coating Compositions and of a Comparative Coating Composition The CathoGuard® 520 pigment pastes from BASF that are used for producing the exemplary inventive coating compositions Z1 and Z2 below, and the comparative coating composition V1, contain bismuth subnitrate. The skilled person knows of the production of such pigment pastes from, for example, DE 10 2008 016 220 A1 (page 7, table 1, variant B).

Comparative Coating Composition V1

An aqueous dispersion of a binder and of a crosslinking agent (commercially available product CathoGuard® 520 from BASF Coatings GmbH with a solids content of 37.5 wt %) (2130 parts) is mixed with fractions of deionized water (2497 parts) at room temperature (18-23° C.) to give a mixture M1. Added to this mixture M1 are a pigment paste (commercially available product CathoGuard® 520 from BASF, with a solids content of 65.0 wt %) (306 parts) and a water-soluble compound containing bismuth(III) (67 parts), and the resulting mixture is mixed with stirring at room temperature (18-23° C.) to give a mixture M2. After further stirring over a time of 24 hours at room temperature (18-23° C.) the comparative coating composition (V1) is obtained accordingly. The water-soluble compound containing bismuth(III) that is used is bismuth L-(+)-lactate (Bi1), with a bismuth content of 11.9 wt %.

The preparation of this Bi1 takes place as described hereinafter: a mixture of L-(+)-lactic acid (88 wt % strength) (613.64 g) and deionized water (1314.00 g) is introduced and heated to 70° C. with stirring. 155.30 g of bismuth(III) oxide is added to this mixture, during which the temperature of the resulting mixture may rise to up to 80° C. After an hour, a further 155.30 g of bismuth(III) oxide are added to this mixture, and again the temperature of the resulting mixture may rise to up to 80° C. After a further hour a further 155.30 g of bismuth(III) oxide are added to this mixture, and the resulting mixture is stirred for 3 hours more. This is followed by addition of 1003 g of deionized water with stirring. After this time, optionally, the resulting mixture is cooled to a temperature in the range from 30 to 40° C., if this temperature has not already been reached. The reaction mixture is subsequently filtered (T1000 depth filter) and the filtrate is used as Bi1. Parts in this context denote parts by weight in each case.

Coating Composition Z1

Inventive coating composition Z1 is prepared in analogy to the preparation of comparative coating composition V1, with the difference that, prior to the further stirring over a time of 24 hours at room temperature (18-23° C.), the mixture M2 is additionally admixed with 19.5 parts of a phosphorus-containing compound blocked with an amine, (P1). Parts here denote parts by weight in each case.

P1 here is prepared by charging 49.75 parts of di-2-ethylhexyl phosphate (acid number 187.15 mg KOH/g) together with 119.17 parts of butyl di glycol to a three-neck flask fitted with stirrer, temperature probe, and dropping funnel, and stirring the resulting mixture at room temperature (18 to 23° C.) for an hour. Then 58.69 parts of tris(2-ethylhexyl)amine are added dropwise at a rate such that the temperature of the mixture does not exceed 60° C. After cooling of the mixture at room temperature (18 to 23° C.), stirring takes place for a further hour, and the resulting mixture is used as P1.

Coating Composition Z2

Inventive coating composition Z2 is prepared in analogy to the preparation of comparative coating composition V1, with the difference that, prior to the further stirring over a time of 24 hours at room temperature (18-23° C.), the mixture M2 is additionally admixed with 29 parts of a phosphorus-containing compound (P) blocked with an amine (blocked compound P1). Parts here denote parts by weight in each case.

The preparation of P1 takes place as described in connection with coating composition Z1.

Table 1 provides an overview of the resulting inventive aqueous coating compositions Z1 and Z2 and of the aqueous comparative coating composition V1:

TABLE 1

|  | Inventive examples Z1 and Z2 and comparative example V1 | | |
| --- | --- | --- | --- |
|  | Z1 | Z2 | V1 |
| CathoGuard ® 520/wt % | 42.43 | 42.35 | 42.60 |
| Bi1/wt % | 1.33 | 1.33 | 1.34 |
| Deionized water/wt % | 49.75 | 49.65 | 49.94 |
| Pigment paste CathoGuard ® 520/wt % | 6.10 | 6.09 | 6.12 |
| P1/wt % | 0.39 | 0.58 | — |

2. Production of Coated Electrically Conductive Substrates by Means of the Inventive Aqueous Coating Composition Z1 or Z2 or the Comparative Coating Composition V1

The aqueous coating composition Z1 or Z2 or the comparative coating composition V1 is applied in each case as a dip coating to a metal test panel as substrate. Each of the compositions Z1 and V1 is applied after its preparation as described above to the respective substrate.

The metal test panel (T1) used is aluminum (ALU), as an example of an electrically conductive substrate. Each of the two sides of the respective panel used has an area of 10.5 cm ·19 cm, giving an overall area of around 400 cm².

They are first of all cleaned in each case by immersion of the panels into a bath containing an aqueous solution comprising the commercially available products Ridoline 1565-1 (3.0 wt %) and Ridosol 1400-1 (0.3 wt %) from Henkel, and also water (96.7 wt %), for a time of 1.5 to 3 minutes at a temperature of 62° C. This is followed by mechanical cleaning (using fine brushes), after which the panels are again immersed into the bath for a time of 1.5 minutes.

The substrates cleaned in this way are subsequently rinsed with water (for a time of 1 minute) and with deionized water (for a time of 1 minute).

Immediately thereafter, an inventively employed aqueous coating composition Z1 or Z2 or the comparative coating composition V1 is applied to each panel T1, with the respective panel being immersed in each case into a corresponding dip-coating bath comprising one of the compositions Z1 or Z2 or V1. The dip-coating bath here has a respective temperature of 32° C.

Coating in the dip-coating bath is carried out by means of a two-stage deposition step and coating step (1), which provides two stages (1a) and (1b), where first of all, potentiostatically, a voltage of 4 V is applied for a time of 120 seconds (corresponding to stage (1a)), to give a preliminary deposition of bismuth.

Subsequently, for the substrates obtained after stage (1a), stage (1b) of step (1) of the method of the invention is carried out, with application of a voltage of 4 V potentiostatically, this being raised continuously and linearly to a voltage in the region of 160-200 V, in each case over a time of 30 seconds, by means of a voltage ramp. This respective voltage is then held for a time in the range from 60 to 180 seconds (hold time).

In detail, for coating of the substrate T1 with one of the compositions V1 or Z1 or Z2, the following parameters are selected:

V1:
Stage (1a): 4 V over 120 seconds (potentiostatically)
Stage (1b): voltage ramp: linear increase in voltage to 200 V over a time of 30 seconds and hold time of 180 seconds at this voltage Z1:
Stage (1a): 4V over 120 seconds (potentiostatically) Stage (1b): voltage ramp: linear increase in voltage to 160 V over a time of 30 seconds and hold time of 60 seconds at this voltage Z2:
Stage (1a): 4V over 120 seconds (potentiostatically) Stage (1b): voltage ramp: linear increase in voltage to 160 V over a time of 30 seconds and hold time of 60 seconds at this voltage The baking step that follows is accomplished by baking the resulting coatings in each case at 175° C. (oven temperature) for a time of 25 minutes. The dry film thicknesses of the aqueous coating compositions of the invention baked onto the respective substrates are in each case 20 μm.

3. Investigation of the Anticorrosion Effect of the CSated substrates

The substrate T1, coated with one of the coating compositions V1, Z1 or Z2, is investigated.

All of the tests below were carried out in accordance with the aforementioned methods of determination and/or with the corresponding standard. Each value in table 3 is the average value (with standard deviation) from a double or triple determination.

TABLE 3

| | Inv. Ex. | Inv. Ex. | Comp. ex. |
|---|---|---|---|
| Substrate | T1 (ALU) | T1 (ALU) | T1 (ALU) |
| Coating composition | Z1 | Z2 | V1 |
| Maximum thread length [mm] as per PAPP WT 3102 (Daimler) after filiform corrosion as per DIN EN 3365 after 1008 h | 6.5 | 4.5 | 8.4 |
| Average thread, length [mm] as per PAPP WT 3102 (Daimler) after filiform corrosion as per DIN EN 3365 after 1008 h | 4.2 | 2.6 | 5.8 |

As can be seen from table 3, the substrates coated by the method of the invention with an aqueous coating composition of the invention consistently exhibit an improved anticorrosion effect in comparison to the substrate coated with the comparative coating composition.

What is claimed is:

1. An aqueous coating composition (A), comprising:
   (A1) at least one cathodically depositable binder; and
   (A2) optionally at least one crosslinking agent, for at least partly coating an electrically conductive substrate with an electrocoat material,
   wherein:
   the coating composition (A) comprises a total amount of at least 30 ppm of bismuth, based on a total weight of the coating composition (A);
   the coating composition (A) comprises at least one phosphorus-containing compound (P) blocked with at least one amine of the general formula (I):

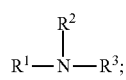
   (I)

$R^1$ and $R^2$ each independently of one another are a $C_{1-18}$ aliphatic radical, are a $C_{3-12}$ cycloaliphatic radical, are a $C_{3-12}$ cycloaliphatic radical bridged via a $C_{1-10}$ aliphatic group, or are an aryl or heteroaryl radical bridged via a $C_{1-10}$ aliphatic group; and
   $R^3$ is H, a $C_{1-18}$ aliphatic radical, a $C_{3-12}$ cycloaliphatic radical, a $C_{3-12}$ cycloaliphatic radical bridged via a $C_{1-10}$ aliphatic group, or an aryl or heteroaryl radical bridged via a $C_{1-10}$ aliphatic group.

2. The coating composition (A) of claim 1, wherein the coating composition (A) has a pH ranging from 4.0 to 6.5.

3. The coating composition (A) of claim 1, comprising at least one phosphorus-containing compound (P), blocked with at least one amine of the general formula (I), in an amount of 0.05 to 5 wt %, based on the total weight of the coating composition (A).

4. The coating composition (A) of claim 1, wherein at least one of the radicals $R^1$, $R^2$, and $R^3$ is a $C_{1-18}$ aliphatic radical.

5. The coating composition (A) of claim 1, wherein at least one of the radicals $R^1$, $R^2$, and $R^3$ is a $C_{3-18}$ alkyl radical.

6. The coating composition (A) of claim 1, wherein $R^3$ is a $C_{1-18}$ aliphatic radical or is an aryl or heteroaryl radical bridged via a $C_{1-10}$ aliphatic group.

7. The coating composition (A) of claim 1, wherein the phosphorus-containing compound (P) is selected from the group consisting of a phosphonic diester, a diphosphonic diester, a phosphoric monoester, a phosphoric diester, anions thereof and a mixture thereof.

8. The coating composition (A) of claim 1,
   wherein:
   the at least one phosphorus-containing compound (P) blocked with the at least one amine is obtained by reacting a phosphorus-containing compound (P) with an amine, and
   the phosphorus-containing compound (P) is a compound of the formula (II) or an anion thereof:

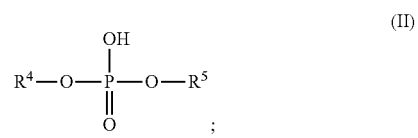
   (II)

wherein
   $R^4$ and $R^5$ each independently of one another are selected from the group consisting of an unsubstituted (hetero) alkyl radical comprising 1 to 20 carbon atoms and optionally 1 to 4 heteroatoms selected from the group consisting of N, NH, N($C_{1-6}$ alkyl), O, and S, an unsubstituted (hetero)cycloalkyl radical comprising 3 to 20 carbon atoms and optionally 1 to 4 heteroatoms selected from the group consisting of N, NH, N($C_{1-6}$ alkyl), O, and S, and an unsubstituted (hetero)aryl radical comprising 5 to 20 carbon atoms and optionally 1 to 4 heteroatoms selected from the group consisting of N, NH, N($C_{1-6}$ alkyl), O, and S; and
   one of the radicals $R^4$ and $R^5$, or both radicals $R^4$ and $R^5$, may additionally be hydrogen.

9. The coating composition (A) of claim 1, wherein the bismuth in the coating composition (A) is present in a form in which it is in solution (A3) and/or not in solution (A4) in the coating composition (A).

10. The coating composition (A) of claim 1, wherein at least a part of the total amount of bismuth in the coating composition (A) is present in a form (A3) in which it is in solution in the coating composition (A).

11. The coating composition (A) of claim 1, wherein the total amount of bismuth present in the coating composition (A) is from 30 ppm to 20 000 ppm.

12. The coating composition (A) claim 1, wherein the coating composition (A) comprises the total amount of at least 130 ppm of bismuth, based on the total weight of the coating composition (A), including
   (A3) at least 100 ppm of bismuth, based on the total weight of the coating composition (A), in a form in which it is in solution in the coating composition (A), or
   (A3) at least 30 ppm of bismuth, based on the total weight of the coating composition (A), in a form in which it is in solution in the coating composition (A), and
   (A4) at least 100 ppm of bismuth, based on the total weight of the coating composition (A), in a form in which it is not in solution in the coating composition (A).

13. The coating composition (A) of claim 1, wherein the coating composition (A) further comprises
   (A5) at least one bidentate complexing agent suitable for complexing bismuth.

14. The coating composition (A) of claim 13, wherein the at least one complexing agent (A5) is present in the aqueous coating composition (A) in a fraction of at least 5 mol %, based on the total amount of bismuth present in the coating composition (A).

15. The coating composition (A) of claim 1, wherein the binder (A1) is a polymeric resin which has at least partly protonated tertiary amino groups, and the crosslinking agent (A2) present optionally is a blocked isocyanate.

16. The coating composition (A) of claim 15, wherein the tertiary amino groups each independently of one another have at least two $C_{1-3}$ alkyl groups each at least singly substituted by a hydroxyl group.

17. A method, comprising at least partly coating an electrically conductive substrate with the aqueous coating composition (A) of claim 1 in the form of the electrocoat material.

18. A method for at least partly coating an electrically conductive substrate with an electrocoat material, the method comprising:
 (1) contacting the electrically conductive substrate, connected as cathode, with the aqueous coating composition (A) of claim 1.

19. The method of claim 18, wherein step (1) is carried out in at least two successive stages (1a) and (1b):
 (1a) at an applied voltage in a range from 1 to 50 V, which is applied for at least 5 seconds, and
 (1b) at an applied voltage in a range from 50 to 400 V, with the proviso that the voltage applied in (1b) is greater by at least 10 V than the voltage applied in (1a).

20. The method of claim 19, wherein the voltage applied in (1a) is applied for 5 to 300 seconds.

21. The method of claim 19, wherein the voltage in (1b) is applied for 0 to 300 seconds time intervals after implementation of (1a) and is maintained for 10 to 300 seconds at a value within the voltage range of 50 to 400 V.

22. An electrically conductive substrate coated at least partly with the aqueous coating composition (A) of claim 1.

23. The electrically conductive substrate of claim 22, wherein the substrate has at least one surface of aluminum.

24. An article or component produced from at least one electrically conductive substrate of claim 20.

* * * * *

UNITED STATES PATENT AND TRADEMARK OFFICE
CERTIFICATE OF CORRECTION

PATENT NO. : 9,982,147 B2
APPLICATION NO. : 15/103118
DATED : May 29, 2018
INVENTOR(S) : Sabine Holtschulte et al.

It is certified that error appears in the above-identified patent and that said Letters Patent is hereby corrected as shown below:

On the Title Page (73), Assignees, Line 1, "Munich (DE);" should read --Muenster, (DE);--.

(56), U.S. Patent Documents, Line 7, "2013/0052489" should read --2013/0052469--.

In the Specification

Column 2, Line 10, "with view" should read --with a view--; and
    Line 59, "are" should read --are a--.

Column 3, Line 56, "ed" should read --used--.

Column 5, Line 40, "least" should read --at least--; and
    Line 65, "is" should read --is a--.

Column 8, Line 22, "(A1)" should read --(A1).--.

Column 9, Lines 14-15, "from polyol," should read --from a polyol,--;
    Line 33, "least" should read --at least--;
    Line 42, "least" should read --at least--; and
    Line 45, "in range" should read --in a range--.

Column 11, Line 29, "amount" should read --amount of--.

Column 14, Line 10, "least" should read --at least--.

Column 18, Lines 6-7, "methylglycidinediacetic" should read --methylglycinediacetic--;
    Line 10, "(HEDTA)" should read --(HEDTA).--;
    Line 33, "groups total," should read --groups. In total,--; and Signed and Sealed this
Twenty-first Day of April, 2020

Andrei Iancu
*Director of the United States Patent and Trademark Office*

CERTIFICATE OF CORRECTION (continued)
U.S. Pat. No. 9,982,147 B2

Line 61, "taurin," should read --taurine,--.

Column 20, Line 1, "(AB)," should read --(A8),--.

Column 21, Line 48, "is" should read --It is--.

Column 22, Line 50, "compound compound" should read --compound (P) is a compound--; and
    Line 54, "least" should read --at least--.

Column 23, Line 19, "formula (1)" should read --formula(I)--;
    Line 28, "a" should read --a $C_{3-12}$--;
    Line 52, "tent-butyl," should read --tert-butyl,--; and
    Line 55, "n-dodecy," should read --n-dodecyl,--.

Column 24, Line 11, "pryidyl" should read --pyridyl--.

Column 26, Line 18, "least" should read --at least--.

Column 28, Lines 33-34, ">25°C." should read --$\leq$25° C.--;
    Line 44, "least" should read --at least--; and
    Line 49, "method" should read --method of--.

Column 29, Line 37, "gaivanostatically" should read --galvanostatically--; and
    Line 61, "least" should read --at least--.

Column 30, Line 21, "form" should read --form of--.

Column 31, Line 17, "least" should read --at least--.

Column 32, Line 2, "method" should read --method of--; and
    Line 37, "least" should read --at least--.

Column 33, Line 41, "lution" should read --solution--.

Column 34, Line 18, "method")in" should read --method"). In--.

Column 35, Line 26, "anlaysis," should read --analysis,--.

Column 38, Line 59, "CSated" should read --coated--.

In the Claims

Column 40, Line 49, Claim 12, "composition (A)" should read --composition (A) of--.